United States Patent
Shargots et al.

(10) Patent No.: US 9,666,313 B2
(45) Date of Patent: May 30, 2017

(54) SMALL MODULAR REACTOR REFUELING SEQUENCE

(71) Applicant: BWXT mPower, Inc., Charlotte, NC (US)

(72) Inventors: Scott J Shargots, Forest, VA (US); Matthew W Ales, Forest, VA (US); James B Inman, Forest, VA (US)

(73) Assignee: BWXT mPower, Inc., Charlotte, NC (US)

( * ) Notice: Subject to any disclaimer, the term of this patent is extended or adjusted under 35 U.S.C. 154(b) by 839 days.

(21) Appl. No.: 13/862,112

(22) Filed: Apr. 12, 2013

(65) Prior Publication Data

US 2013/0301779 A1     Nov. 14, 2013

Related U.S. Application Data

(60) Provisional application No. 61/625,188, filed on Apr. 17, 2012.

(51) Int. Cl.
*G21C 19/20* (2006.01)
*G21C 1/32* (2006.01)
*G21C 19/18* (2006.01)

(52) U.S. Cl.
CPC ............. *G21C 19/20* (2013.01); *G21C 1/322* (2013.01); *G21C 19/18* (2013.01); *Y02E 30/40* (2013.01)

(58) Field of Classification Search
CPC ...................................... G21C 3/33
USPC ................................. 376/260, 262
See application file for complete search history.

(56) References Cited

U.S. PATENT DOCUMENTS

| | | | |
|---|---|---|---|
| 2,848,404 A | 8/1958 | Treshow | |
| 3,212,979 A | 10/1965 | Silverblatt | |
| 3,325,374 A | 6/1967 | Margen | |
| 4,072,563 A * | 2/1978 | McDonald | G21C 1/322 376/262 |

(Continued)

OTHER PUBLICATIONS

International Search Report and Written Opinion for PCT/US2014/026117 dated Nov. 20, 2014.

(Continued)

*Primary Examiner* — Jack W Keith
*Assistant Examiner* — Lily C Garner
(74) *Attorney, Agent, or Firm* — Nelson Mullins Riley & Scarborough, LLP

(57) ABSTRACT

A nuclear reactor includes at least: a pressure vessel including an upper vessel section and a lower vessel section connected by a mid-flange and containing primary coolant; a nuclear reactor core disposed in the lower vessel section and immersed in the primary coolant; and upper internals suspended from the mid-flange of the pressure vessel. The upper internals include at least internal CRDMs immersed in the primary coolant and control rod guide frames. To refuel, the nuclear reactor is depressurized. The upper vessel section is disconnected and removed while leaving the mid-flange in place with the upper internals remaining suspended from the mid-flange. The mid-flange is then removed with the upper internals remaining suspended from the mid-flange. The fuel is replaced, the mid-flange is placed back onto the lower vessel section with the upper internals remaining suspended from the mid-flange, and the upper vessel section is placed back and re-connected.

13 Claims, 30 Drawing Sheets

(56) References Cited

U.S. PATENT DOCUMENTS

| | | | |
|---|---|---|---|
| 4,649,868 A * | 3/1987 | Smith, Jr. | F28F 19/00 122/32 |
| 4,778,645 A | 10/1988 | Altman et al. | |
| 4,847,038 A | 7/1989 | Martin | |
| 4,885,127 A | 12/1989 | Yokoyama | |
| 4,895,698 A | 1/1990 | DeMario | |
| 4,923,669 A | 5/1990 | DeMario | |
| 4,957,697 A | 9/1990 | Wada | |
| 4,966,745 A | 10/1990 | Widener et al. | |
| 4,990,304 A | 2/1991 | Rylatt | |
| 4,994,233 A | 2/1991 | Freeman | |
| 4,996,018 A | 2/1991 | Bhatt et al. | |
| 5,009,837 A | 4/1991 | Nguyen et al. | |
| 5,024,806 A | 6/1991 | Cioffi et al. | |
| 5,030,413 A | 7/1991 | Knierriem et al. | |
| 5,043,134 A | 8/1991 | Widener et al. | |
| 5,053,190 A | 10/1991 | Gardner et al. | |
| 5,068,083 A | 11/1991 | John, Jr. et al. | |
| 5,089,218 A | 2/1992 | Gardner et al. | |
| 5,158,740 A | 10/1992 | Boatwright | |
| 5,207,980 A | 5/1993 | Gilmore et al. | |
| 5,265,137 A | 11/1993 | Busch | |
| 5,268,948 A | 12/1993 | Church et al. | |
| 5,282,231 A | 1/1994 | Adams et al. | |
| 5,282,233 A | 1/1994 | Bryan | |
| 5,299,246 A | 3/1994 | Bryan | |
| 5,328,667 A | 7/1994 | Johnson | |
| 5,367,549 A | 11/1994 | Hatfield | |
| 5,436,945 A | 7/1995 | Weisel et al. | |
| 5,465,280 A | 11/1995 | Wedellsborg | |
| 5,513,234 A | 4/1996 | Rottenberg | |
| 5,563,927 A | 10/1996 | Siegel et al. | |
| 5,574,759 A | 11/1996 | Dietrich et al. | |
| 5,583,900 A | 12/1996 | Kasahara et al. | |
| 5,600,686 A | 2/1997 | Stoss | |
| 5,640,434 A | 6/1997 | Rottenberg | |
| 5,715,288 A | 2/1998 | Matteson | |
| 5,774,513 A | 6/1998 | Urko | |
| 5,789,720 A | 8/1998 | LaGally et al. | |
| 5,930,318 A | 7/1999 | Baversten et al. | |
| 5,935,439 A | 8/1999 | Hart et al. | |
| 5,960,051 A | 9/1999 | Challberg et al. | |
| 6,055,288 A | 4/2000 | Schwirian | |
| 6,088,420 A | 7/2000 | Yokoyama et al. | |
| 6,091,791 A | 7/2000 | Matsumoto et al. | |
| 6,198,787 B1 | 3/2001 | Hasegawa et al. | |
| 6,252,922 B1 | 6/2001 | Hasegawa et al. | |
| 6,546,066 B2 | 4/2003 | Baliga et al. | |
| 6,608,879 B2 | 8/2003 | Aoki et al. | |
| 6,618,460 B2 | 9/2003 | Baliga et al. | |
| 6,625,245 B1 | 9/2003 | Aoki et al. | |
| 6,643,349 B2 | 11/2003 | Aoki et al. | |
| 6,744,841 B1 | 6/2004 | Aoki et al. | |
| 6,769,262 B1 | 8/2004 | Gray | |
| 6,810,099 B2 | 10/2004 | Nakamaru et al. | |
| 6,856,663 B2 | 2/2005 | Colditz et al. | |
| 6,856,664 B2 | 2/2005 | Pence et al. | |
| 6,888,908 B1 | 5/2005 | Klarner et al. | |
| 6,895,067 B2 | 5/2005 | Borum et al. | |
| 6,909,765 B2 | 6/2005 | Lahoda | |
| 7,139,357 B2 | 11/2006 | Colditz et al. | |
| 7,139,359 B2 | 11/2006 | Baliga et al. | |
| 7,280,946 B2 | 10/2007 | Russell, II et al. | |
| 7,389,669 B2 | 6/2008 | Badlani et al. | |
| 7,424,412 B2 | 9/2008 | Kropaczek et al. | |
| 7,428,479 B2 | 9/2008 | Boer et al. | |
| 7,453,972 B2 | 11/2008 | Hellandbrand, Jr. et al. | |
| 7,526,058 B2 | 4/2009 | Fawcett et al. | |
| 7,548,602 B2 | 6/2009 | Smith, III et al. | |
| 7,567,645 B2 | 7/2009 | Baliga | |
| 7,574,337 B2 | 8/2009 | Kropaczek et al. | |
| 2003/0123600 A1 | 7/2003 | Hesketh et al. | |
| 2003/0169839 A1 | 9/2003 | Matteson | |
| 2004/0017877 A1 | 1/2004 | Hartel et al. | |
| 2004/0136488 A1 | 7/2004 | Tuite et al. | |
| 2005/0069080 A1 | 3/2005 | Goldenfield et al. | |
| 2005/0117684 A1 | 6/2005 | Klarner et al. | |
| 2005/0190877 A1 | 9/2005 | Knapp | |
| 2005/0199591 A1 | 9/2005 | Coe et al. | |
| 2006/0153327 A1 | 7/2006 | Jiang | |
| 2006/0222140 A1 | 10/2006 | Aleshin et al. | |
| 2006/0251205 A1 | 11/2006 | Balog | |
| 2007/0133732 A1 | 6/2007 | Nakayama et al. | |
| 2007/0206717 A1 | 9/2007 | Conner et al. | |
| 2008/0084957 A1 | 4/2008 | Aleshin et al. | |
| 2009/0032178 A1 | 2/2009 | Feinroth | |
| 2010/0150294 A1 | 6/2010 | Weisel et al. | |
| 2010/0316177 A1 * | 12/2010 | Stambaugh | G21C 7/117 376/229 |
| 2011/0235768 A1 | 9/2011 | Heim et al. | |
| 2012/0027155 A1 | 2/2012 | Kamath et al. | |
| 2012/0076254 A1 | 3/2012 | Malloy et al. | |
| 2012/0294405 A1 | 11/2012 | Shargots | |
| 2013/0044850 A1 | 2/2013 | Walton et al. | |
| 2013/0294565 A1 | 11/2013 | Harkness et al. | |

OTHER PUBLICATIONS

International Search Report and Written Opinion for PCT/US2013/036570 dated Sep. 17, 2013.

* cited by examiner

200

```
┌─────────────────────────────────────────────────────────────┐
│ The upper vessel electrical connections are disconnected    │
│ (i.e. pressurizer heaters, instrumentation) 210             │
├─────────────────────────────────────────────────────────────┤
│ Optionally, all connections through mid-flange are broken as well, │
│ e.g. if the electrical and piping for the lower vessel assembly │
│ is routed down the side of the upper vessel and             │
│ also ride with the upper vessel 215                         │
└─────────────────────────────────────────────────────────────┘
                              │
                              ▼
           ┌──────────────────────────────────────┐
           │ The upper vessel crane is hooked up 220 │
           └──────────────────────────────────────┘
                              │
                              ▼
┌─────────────────────────────────────────────────────────────┐
│ The reactor vessel nuts at the main closure are de-tensioned 230 │
└─────────────────────────────────────────────────────────────┘
                              │
                              ▼
┌─────────────────────────────────────────────────────────────┐
│ The reactor vessel studs are backed out of the lower vessel flange. │
│ Then, the reactor vessel nuts and reactor vessel studs are parked │
│ in their transport position on the upper vessel flange 240  │
├─────────────────────────────────────────────────────────────┤
│ Optionally, the reactor vessel nuts and reactor vessel studs are │
│ completely removed and placed into a separate transport rack 245 │
└─────────────────────────────────────────────────────────────┘
                              │
                              ▼
┌─────────────────────────────────────────────────────────────┐
│ The upper vessel is moved to the upper vessel maintenance stand │
│ for inspection 250                                          │
└─────────────────────────────────────────────────────────────┘
```

Fig. 3

```
┌─────────────────────────────────────────────────────────────────────┐
│ The fuel assembly refueling crane is brought in and removes the     │
│ spent fuel. The spent fuel is transported through the refueling     │
│ canal to the fuel transport system. From there, the fuel assembly   │
│ is transported to the spent fuel pool. All the spent fuel is        │
│ removed before any new fuel is brought in.                          │
│                              1910                                    │
└─────────────────────────────────────────────────────────────────────┘
                                  │
                                  ▼
┌─────────────────────────────────────────────────────────────────────┐
│         New fuel assemblies are brought in through the refueling    │
│         canal. The refueling crane removes the fuel assembly from   │
│         the fuel transport system and places it within the lower    │
│         vessel.  1920                                                │
└─────────────────────────────────────────────────────────────────────┘
                                  │
                                  ▼
┌─────────────────────────────────────────────────────────────────────┐
│          Install mid-flange standoffs onto lower vessel flange. 1930│
└─────────────────────────────────────────────────────────────────────┘
                                  │
                                  ▼
┌─────────────────────────────────────────────────────────────────────┐
│              Place new o-rings onto surface of lower vessel. 1940   │
└─────────────────────────────────────────────────────────────────────┘
                                  │
                                  ▼
┌─────────────────────────────────────────────────────────────────────┐
│       Place upper internals and refueling platform onto standoffs   │
│       in sequence with the refueling canal being drained. 1950      │
└─────────────────────────────────────────────────────────────────────┘
                                  │
                                  ▼
┌─────────────────────────────────────────────────────────────────────┐
│      Cut and dispose existing o-rings. Inspect both o-ring sealing  │
│         surfaces on flanges then install new o-rings. 1960          │
├─────────────────────────────────────────────────────────────────────┤
│      Alternatively, inspect the sealing surface on both sealing     │
│     surfaces, but the redundant o-rings would not be installed      │
│                  on the mid-flange. The o-rings would be            │
│               installed on the lower vessel flange. 1965            │
└─────────────────────────────────────────────────────────────────────┘
                                  │
                                  ▼
┌─────────────────────────────────────────────────────────────────────┐
│              Lift upper internals and remove standoffs.. 1970       │
└─────────────────────────────────────────────────────────────────────┘
                                  │
                                  ▼
┌─────────────────────────────────────────────────────────────────────┐
│     Place upper internals onto lower vessel. Reconnect control rod  │
│           drive mechanisms (CRDMs) with connection tool. 1980       │
└─────────────────────────────────────────────────────────────────────┘
```

1900 (flow label)

Fig. 20

SMALL MODULAR REACTOR REFUELING SEQUENCE

This application claims the benefit of U.S. Provisional Application No. 61/625,188 filed Apr. 17, 2012. U.S. Provisional Application No. 61/625,188 filed Apr. 17, 2012 is hereby incorporated by reference in its entirety.

BACKGROUND

The following relates to the nuclear reactor arts and related arts.

In nuclear reactor designs of the pressurized water reactor (PWR) type, a nuclear reactor core is immersed in primary coolant water at or near the bottom of a pressure vessel. In a typical design, the primary coolant is maintained in a subcooled liquid phase in a cylindrical pressure vessel that is mounted generally upright (that is, with its cylinder axis oriented vertically). A hollow cylindrical central riser is disposed concentrically inside the pressure vessel. Primary coolant flows upward through the reactor core where it is heated and rises through the central riser, discharges from the top of the central riser, and reverses direction to flow downward back toward the reactor core through a downcomer annulus defined between the pressure vessel and the central riser. The nuclear core is built up from multiple fuel assemblies each comprising a bundle of fuel rods containing fissile material (usually $^{235}U$).

In a typical PWR design, upper internals located above the reactor core include control rod assemblies with neutron-absorbing control rods that are inserted into/raised out of the reactor core by control rod drive mechanisms (CRDMs). Conventionally, the CRDMs employ motors mounted on tubular pressure boundary extensions extending above the pressure vessel. In this design, the complex motor stator can be outside the pressure boundary and magnetically coupled with the motor rotor disposed inside the tubular pressure boundary extension. The pressure vessel of the PWR is conventionally connected with an external pressurizer and external steam generators via large-diameter piping.

More recent small modular reactor (SMR) designs have been driven by a desire to make the PWR more compact and to have fewer large diameter vessel penetrations. Toward this end, in so-called "integral" PWR design, the steam generator is located inside the pressure vessel, typically in the downcomer annulus. This replaces the external primary coolant loop carrying radioactive primary coolant by a secondary coolant/steam loop carrying nonradioactive secondary coolant. The use of an internal pressurizer comprising a steam bubble at the top of the pressure vessel and suitable baffling is contemplated to eliminate the large-diameter penetration for the external pressurizer. Still further, fully internal CRDM motors are contemplated, which eliminates the tubular pressure boundary extensions above the reactor vessel. Some illustrative PWR designs incorporating these advances are described in, e.g.: Thome et al., "Integral Helical-Coil Pressurized Water Nuclear Reactor", U.S. Pub. No. 2010/0316181 A1 published Dec. 16, 2010 which is incorporated by reference in its entirety; Malloy et al., U.S. Pub. No. 2012/0076254 A1 published Mar. 29, 2012 which is incorporated by reference in its entirety; Stambaugh et al., U.S. Pub. No. 2010/0316177 A1 published Dec. 16, 2010 which is incorporated herein by reference in its entirety; and DeSantis, U.S. Pub. No. 2011/0222640 A1 published Sep. 15, 2011 which is incorporated herein by reference in its entirety.

Such SMR designs introduce numerous challenges not faced in more conventional PWR designs. One such challenge is reactor refueling. SMR components are tightly packed into a compact pressure vessel, with the nuclear reactor core located at or near the bottom of the pressure vessel in order to minimize the possibility of the primary coolant water level falling to a point that exposes the reactor core during a loss of coolant accident (LOCA). This means that all major components are located above the reactor core, and must be removed in order to access the reactor core for refueling. For example, in PWR designs disclosed in Stambaugh et al., U.S. Pub. No. 2010/0316177 A1, an upper internals basket welded to a mid-flange of the pressure vessel supports the internal CRDMs and the control rod guide frames, and power and signal connections for the CRDMs are routed to connectors on the mid-flange. These components must be removed in order to access the reactor core.

Disclosed herein are improvements that provide various benefits that will become apparent to the skilled artisan upon reading the following.

BRIEF DESCRIPTION

In accordance with one aspect, a nuclear reactor includes at least: a pressure vessel including an upper vessel section and a lower vessel section connected by a mid-flange and containing primary coolant; a nuclear reactor core disposed in the lower vessel section and immersed in the primary coolant; and upper internals suspended from the mid-flange of the pressure vessel. The upper internals include at least internal control rod drive mechanisms (CRDMs) with CRDM motors immersed in the primary coolant and control rod guide frames disposed between the CRDM motors and the nuclear reactor core. In a disclosed method, the nuclear reactor is depressurized. The upper vessel section is disconnected and removed from the remainder of the pressure vessel while leaving the mid-flange in place on the lower vessel section with the upper internals remaining suspended from the mid-flange. The mid-flange is removed from the lower vessel section with the upper internals remaining suspended from the mid-flange. Fuel of the nuclear reactor core is replaced, the mid-flange is placed back onto the lower vessel section with the upper internals remaining suspended from the mid flange, and the upper vessel section is placed back onto the remainder of the pressure vessel and is re-connected with the remainder of the pressure vessel.

In accordance with another aspect, a nuclear reactor includes at least: a pressure vessel including an upper vessel section and a lower vessel section connected by a flange assembly and containing primary coolant wherein the flange assembly includes at least a flange on the upper vessel section and a flange on the lower vessel section; a nuclear reactor core disposed in the lower vessel section and immersed in the primary coolant; a support element supported by the lower vessel section; and upper internals disposed in the pressure vessel and suspended from the support element. The upper internals include at least internal control rod drive mechanisms (CRDMs) with CRDM motors immersed in the primary coolant and control rod guide frames disposed between the CRDM motors and the nuclear reactor core. In a disclosed method, the nuclear reactor is depressurized, the upper vessel section is disconnected from the lower vessel section and lifted away from the lower vessel section with the support element remaining supported by the lower vessel section and the upper internals remaining suspended from the support element, the support element is lifted away from the lower vessel section with the upper internals remaining suspended from the support element so as to lift both the support element and the suspended upper internals away from the lower vessel section, fuel of the nuclear reactor core disposed in the lower vessel section is replaced, the support element is lowered back onto the lower vessel section with the upper internals remaining suspended from the support element, the upper vessel section is reconnected to the lower vessel section, and the nuclear reactor is re-pressurized. In some embodiments the support element comprises a flange of the flange assembly connecting the upper and lower vessel sections.

In accordance with another aspect, a nuclear reactor includes at least: a pressure vessel including an upper vessel section and a lower vessel section connected by a flange assembly and containing primary coolant wherein the flange assembly includes at least a flange on the upper vessel section and a flange on the lower vessel section; a nuclear reactor core disposed in the lower vessel section and immersed in the primary coolant; a support element supported by the lower vessel section; and upper internals disposed in the pressure vessel and suspended from the support element. The upper internals include at least internal control rod drive mechanisms (CRDMs) with CRDM motors immersed in the primary coolant and control rod guide frames disposed between the CRDM motors and the nuclear reactor core. The nuclear reactor is configured to be prepared for refueling by operations including disconnecting the upper vessel section from the lower vessel section and lifting the upper vessel section away from the lower vessel section with the support element remaining supported by the lower vessel section and the upper internals remaining suspended from the support element, and lifting the support element away from the lower vessel section with the upper internals remaining suspended from the support element so as to provide access from above to the nuclear reactor core disposed in the lower vessel section. In some embodiments the support element comprises a mid-flange of the flange assembly that is disposed between the flange on the upper vessel section and the flange on the lower vessel section. Optionally, the mid-flange includes vessel penetrations connected by cables with the upper internals that remain connected by cables with the upper internals during the lifting of the mid-flange away from the lower vessel section.

BRIEF DESCRIPTION OF THE DRAWINGS

FIGS. 2-5 diagrammatically flowchart the preparatory phase of a refueling sequence from reactor shutdown to the beginning of the fuel exchange.

FIGS. 20-22 diagrammatically flowchart the refueling and restart phases of a refueling sequence from beginning of the fuel exchange to reactor start-up.

DETAILED DESCRIPTION

Figure 1:
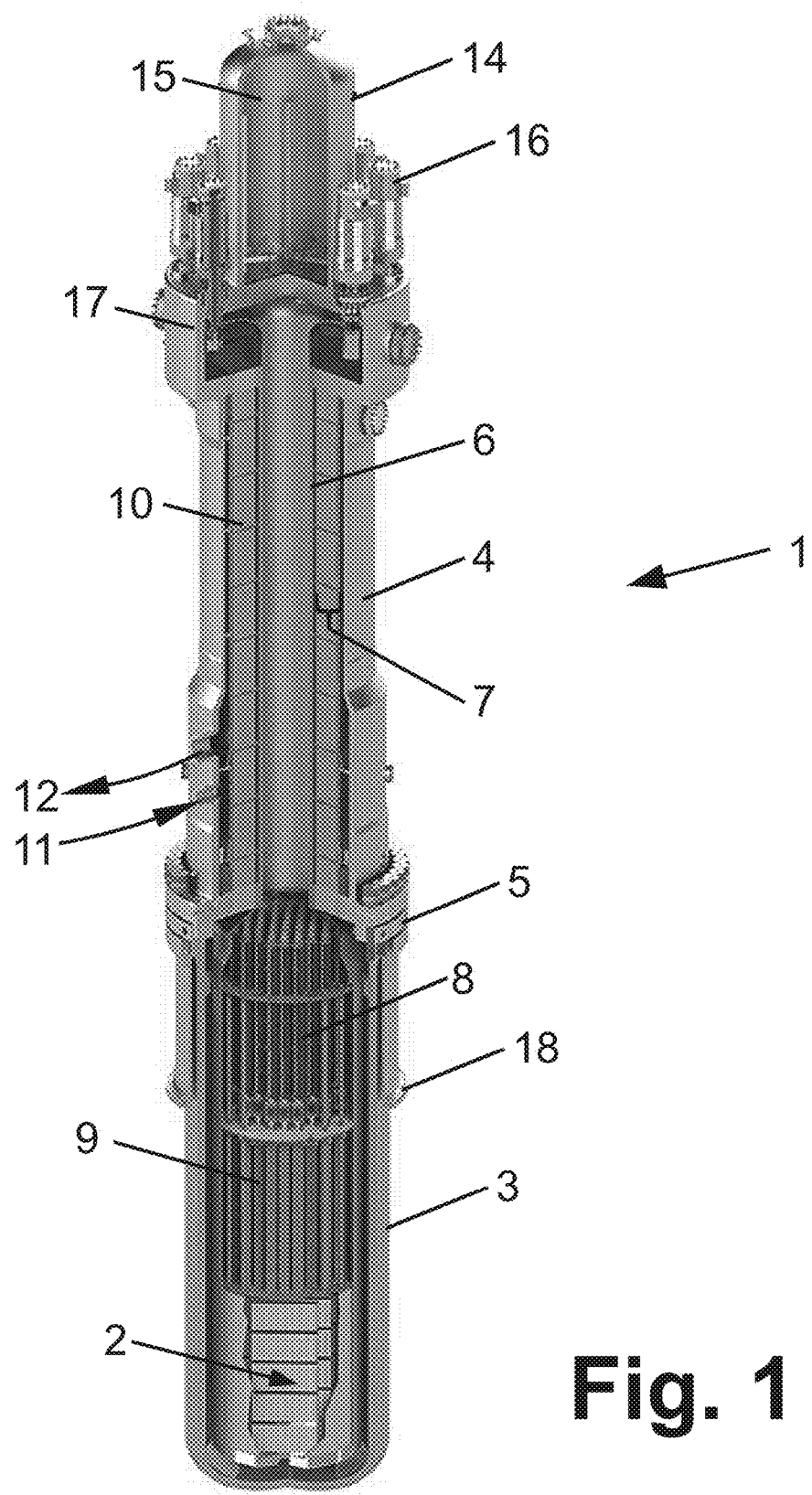
FIG. 1 diagrammatically illustrates a cutaway view of an illustrative small modular reactor (SMR) of the of the integral pressurized water reactor (PWR) variety, showing selected internal components.

With reference to FIG. 1, a small modular reactor (SMR) 1 of the of the integral pressurized water reactor (PWR) variety is shown in partial cutaway to reveal selected internal components. The illustrative PWR 1 includes a nuclear reactor core 2 disposed in a pressure vessel comprising a lower vessel portion 3 and an upper vessel portion 4. The lower and upper vessel portions 3, 4 are connected by a mid-flange 5. Specifically, a lower flange 5L at the open top of the lower vessel portion 3 connects with the bottom of the mid-flange 5, and an upper flange 5U at the open bottom of the upper vessel portion 4 connects with a top of the mid-flange 5.

The reactor core 2 is disposed inside and at or near the bottom of the lower vessel portion 3, and comprises a fissile material (e.g., $^{235}$U) immersed in primary coolant water. A cylindrical central riser 6 is disposed coaxially inside the cylindrical pressure vessel and a downcomer annulus 7 is defined between the central riser 6 and the pressure vessel. The illustrative PWR 1 includes internal control rod drive mechanisms (internal CRDMs) 8 with internal motors 8$m$ immersed in primary coolant that control insertion of control rods to control reactivity. Guide frames 9 guide the translating control rod assembly (e.g., each including a set of control rods comprising neutron absorbing material yoked together by a spider and connected via a connecting rod with the CRDM). The illustrative PWR 1 employs one or more internal steam generators 10 located inside the pressure vessel and secured to the upper vessel portion 4, but embodiments with the steam generators located outside the pressure vessel (i.e., a PWR with external steam generators) are also contemplated. The illustrative steam generator 10 is of the once-through straight-tube type with internal economizer, and is fed by a feedwater inlet 11 and deliver steam to a steam outlet 12. See Malloy et al., U.S. Pub. No. 2012/0076254 A1 published Mar. 29, 2012 which is incorporated by reference in its entirety.

The illustrative PWR 1 includes an integral pressurizer 14 at the top of the upper vessel section 4 which defines an integral pressurizer volume 15; however an external pressurizer connected with the pressure vessel via suitable piping is also contemplated. The primary coolant in the illustrative PWR 1 is circulated by reactor coolant pumps (RCPs). In the illustrative embodiment of FIG. 1, each RCP comprises an external RCP motor 16 driving an impeller located in a RCP casing 17 disposed inside the pressure vessel. The illustrative PWR 1 also includes an optional support skirt 18.

With reference to FIGS. 2-30, an illustrative refueling sequence is disclosed for a reactor of the type shown in FIG. 1. The refueling sequence utilizes the flange arrangement in which (1) the upper flange 5U is integral with the upper vessel 4; the lower flange 5L is integral with the lower vessel 3; and the mid-flange 5 is disposed between the upper and lower flanges 5U, 5L and supports the upper internals (including the CRDMs 8 and guide frames 9) in suspended fashion.

In brief, the upper vessel 4 is removed with the integral steam generator 10 secured inside the upper vessel 4; then the mid-flange 5 is removed along with the upper internals 8, 9 suspended from the mid-flange 5 so that the reactor core is then accessible from above for refueling. This approach avoids the need to disassemble internal components.

Figure 2:
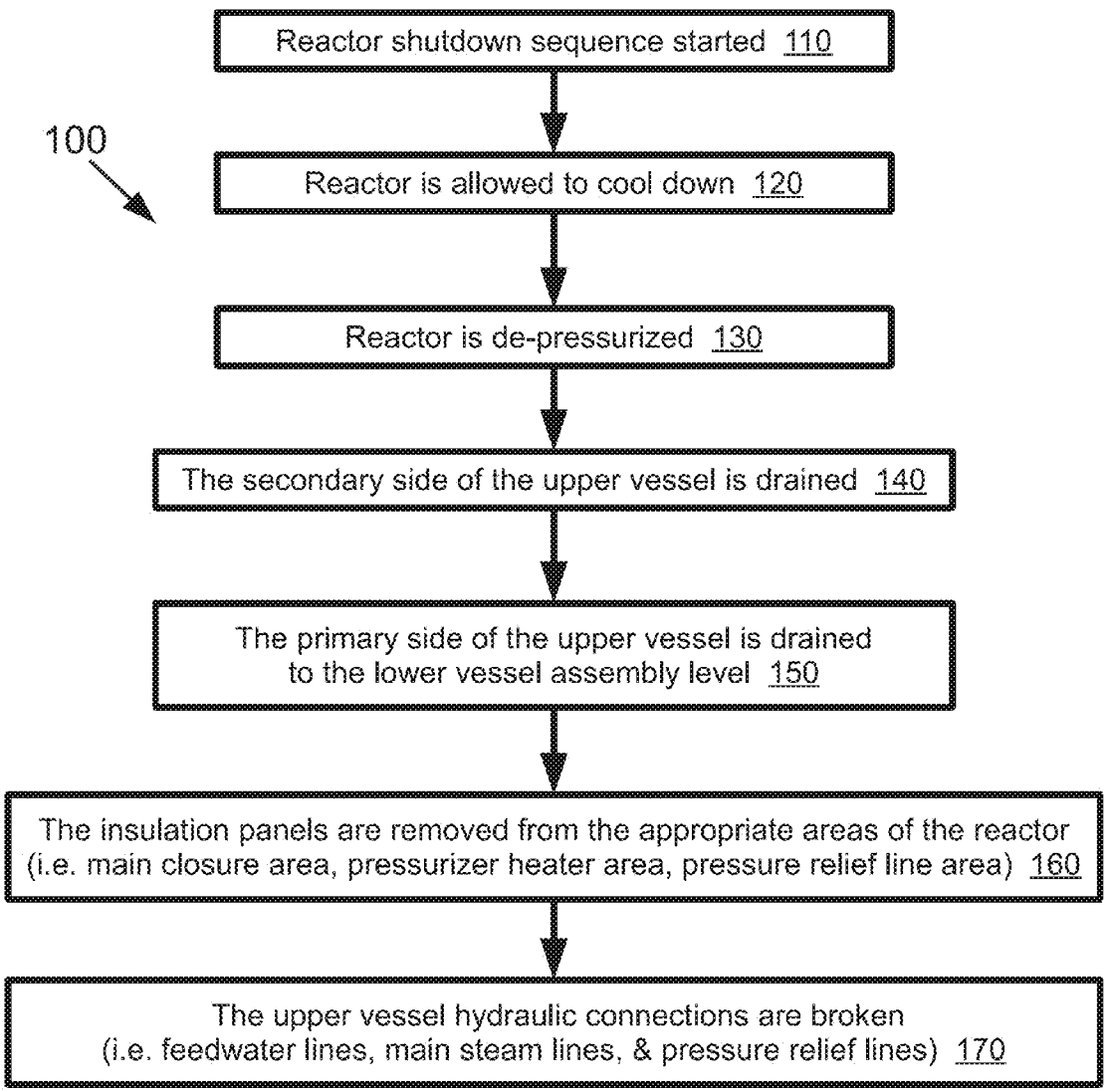

FIG. 2 illustrates a flowchart of a first portion 100 of the refueling sequence, including: starting the reactor shutdown sequence 110, allowing the reactor to cool down 120; depressurizing the reactor 130; draining the secondary side of the upper vessel 140; draining the primary side of the upper vessel to the lower vessel assembly level 150; removing the insulation panels from the appropriate areas of the reactor (i.e. the main closure area, pressurizer heater area, and pressure relief area) 160; and breaking the hydraulic connections (i.e. feedwater lines, main stream lines, and pressure relief lines) 170.

FIG. 3 illustrates a flowchart of a second portion 200 of the sequence for removing spent fuel from the reactor, starting with disconnecting the upper vessel external electrical connections (i.e. pressurizer heaters and instrumentation) 210. If the electrical and piping for the lower vessel assembly are routed down the side of the upper vessel and also ride with the upper vessel, then in a further operation 215 all of the connections through the mid-flange are broken. An upper vessel crane is connected 220. The reactor vessel nuts at the main closure are de-tensioned in an operation 230. The reactor vessel studs are backed out of the lower vessel flange and the reactor vessel studs are backed out of the lower vessel flange and the reactor vessel nuts and reactor vessel studs are parked in the transport position on the upper flange in an operation 240. Optionally, the reactor vessel nuts and the reactor vessel studs are completely removed and placed into a separate transport rack, as indicated in FIG. 3 by an operation 245. Finally, the upper vessel is moved to the upper vessel maintenance stand for inspection in an operation 250.

Figure 4:
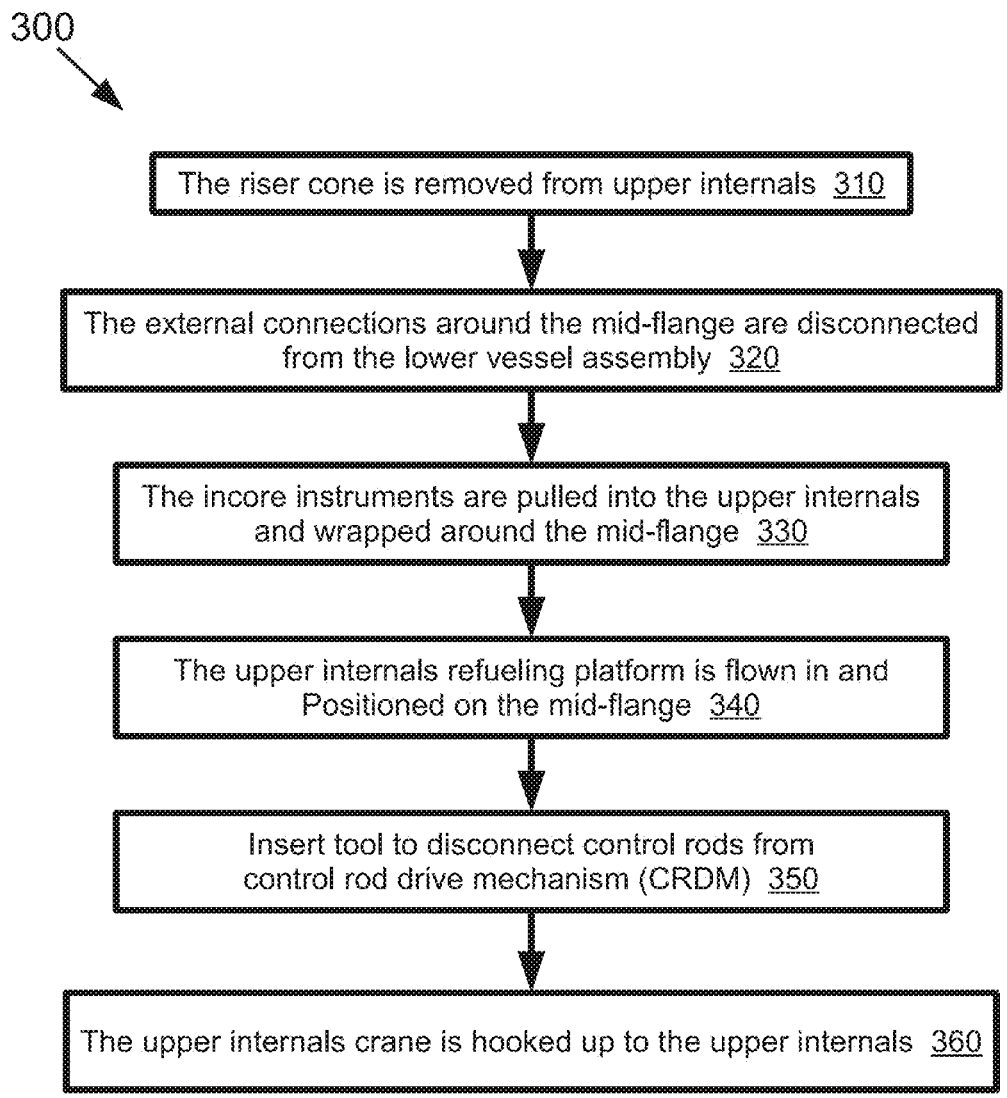

FIG. 4 illustrates a flowchart of a third portion 300 of the refueling sequence, including: removing the riser cone from the upper internals 310; disconnecting the external connections around the mid-flange from the lower vessel assembly 320; pulling the incore instruments into the upper internals and wrapping the incore instruments around the mid-flange 330; positioning the upper internals platform on the mid-flange 340; inserting a tool to disconnect control rods from the control rod drive mechanism (CRDM) 350; and hooking the upper internals crane up to the upper internals 360.

Figure 5:
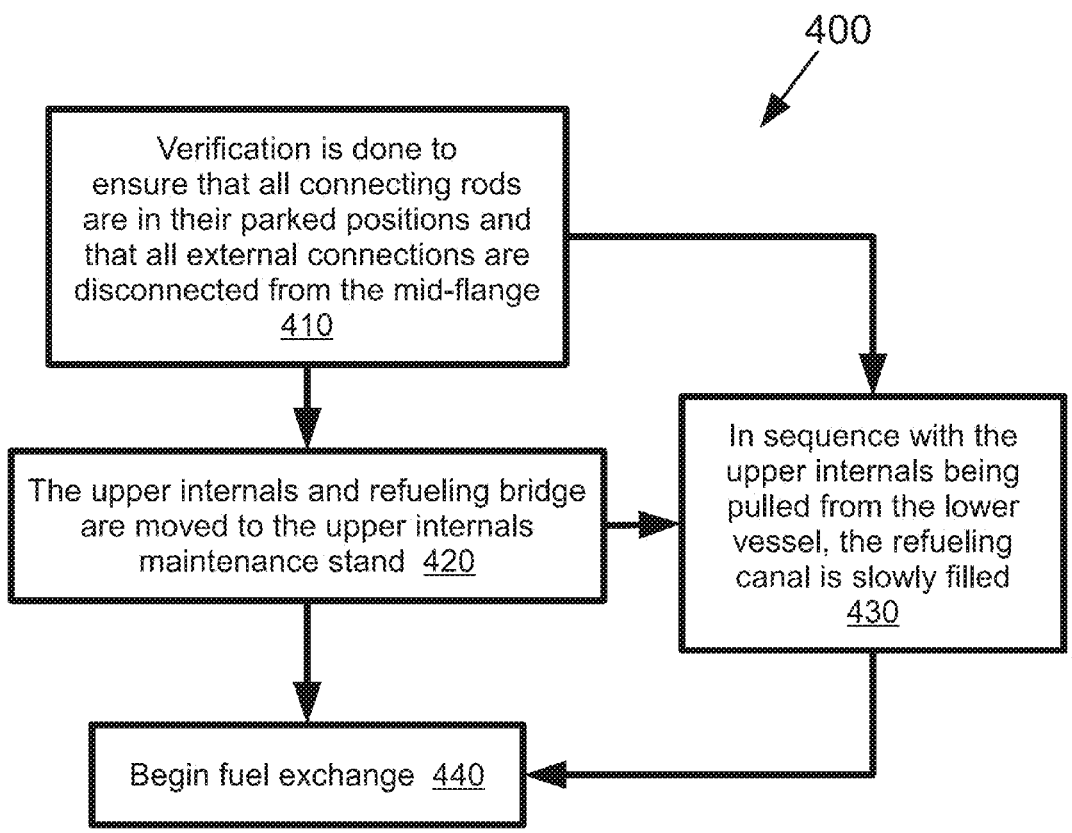

FIG. 5 illustrates a flowchart of a fourth portion 400 of the refueling sequence. The portion 400 includes: verifying that all connecting rods are in a parked position and that all external connections are disconnected from the mid-flange 410; moving the upper internals and refueling bridge to the upper internals maintenance stand 420; and in sequence with the upper internals being pulled from the lower vessel, slowly filling the refueling canal 430. At the end of this portion 400, the fuel exchange can begin in operation 440.

With reference to FIGS. 6-19, the state of an illustrative SMR of the integral PWR variety is shown at various stages of the process flowcharted in FIGS. 2-5. The SMR of FIGS. 6-19 is similar to that of FIG. 1. A difference between the illustrative SMR of FIG. 1 and that of FIGS. 6-19 is that in the SMR of FIG. 1 the reactor coolant pumps (RCPs) are mounted on the upper vessel 4 proximate to the integral pressurizer 14 with external RCP motors 16 driving impellers located in RCP casings 17 disposed inside the pressure vessel; whereas, in the SMR of FIGS. 6-19 the RCPs are wholly internal RCPs 167 that are part of the upper internals suspended from the mid-flange 5 (see, e.g. FIGS. 14-17). It is to be understood that the disclosed refueling process is also applicable to a reactor design such as that of FIG. 1 in which the RCPs have external motors (e.g., wholly dry motor/stator assemblies or dry stators coupled with wet stators via tubular pressure boundary extensions).

Figure 6:
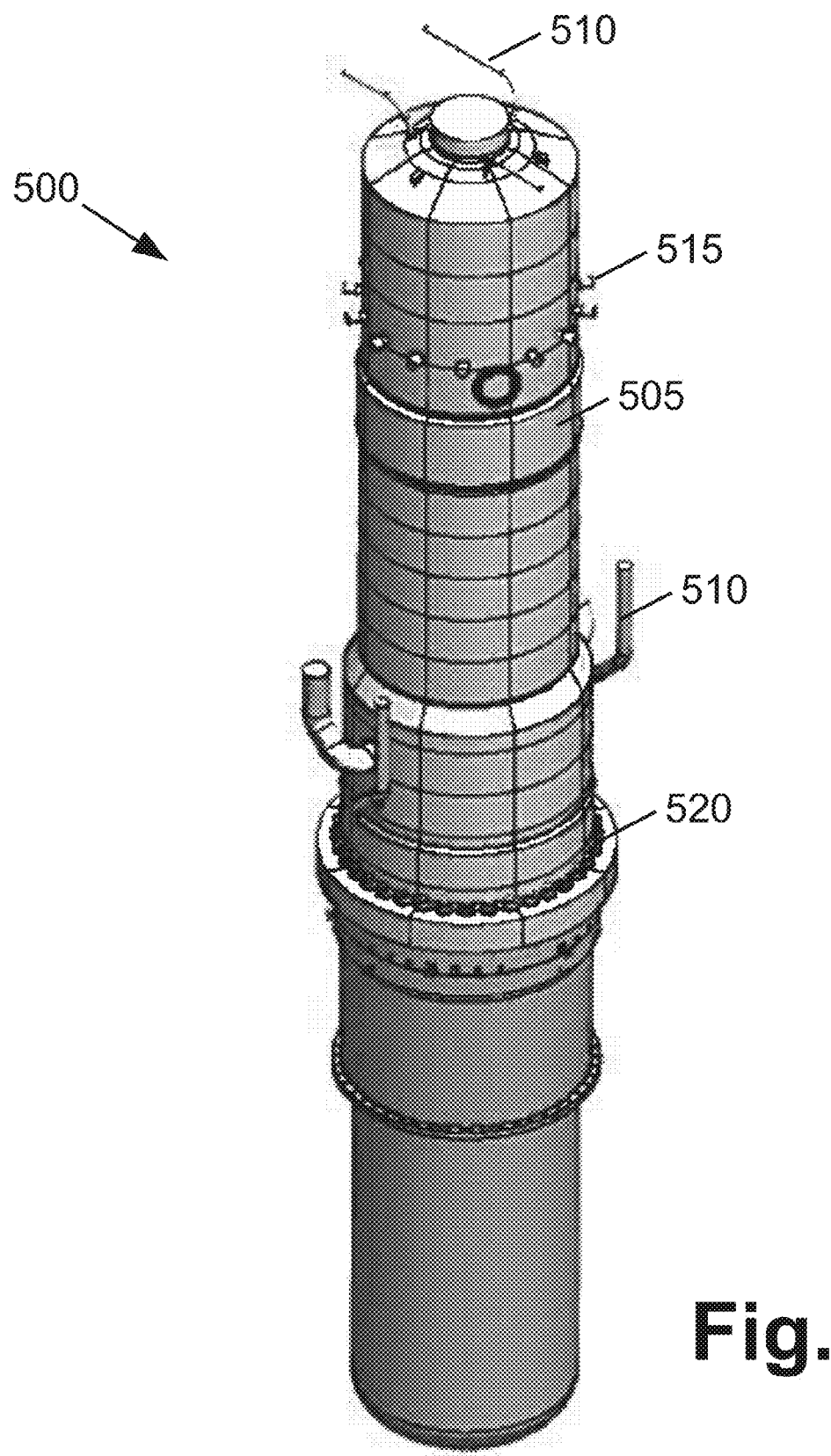
FIGS. 6-19 illustrate a SMR of the integral PWR variety at various stages of the preparatory sequence of FIGS. 2-5.

FIG. 6 diagrammatically shows the SMR in an operational state 500. The operational reactor 500 includes components not shown in FIG. 1, including metal reflective insulation 505, upper vessel hydraulic connections 510, pressurized heater electrical connections 515, and upper internals electrical connections 520. (Additional components ancillary to the operating reactor 500, such as a surrounding containment structure, reactor support including a floodwell, piping running to/from a turbine, various emergency core cooling and other safety-related components, and so forth are not illustrated). The operational state 500 corresponds to the state of the reactor just before reactor shutdown 110, and illustrates the externally observed state of the reactor during the operations 110, 120, 130, 140, 150 of FIG. 2.

Figure 7:
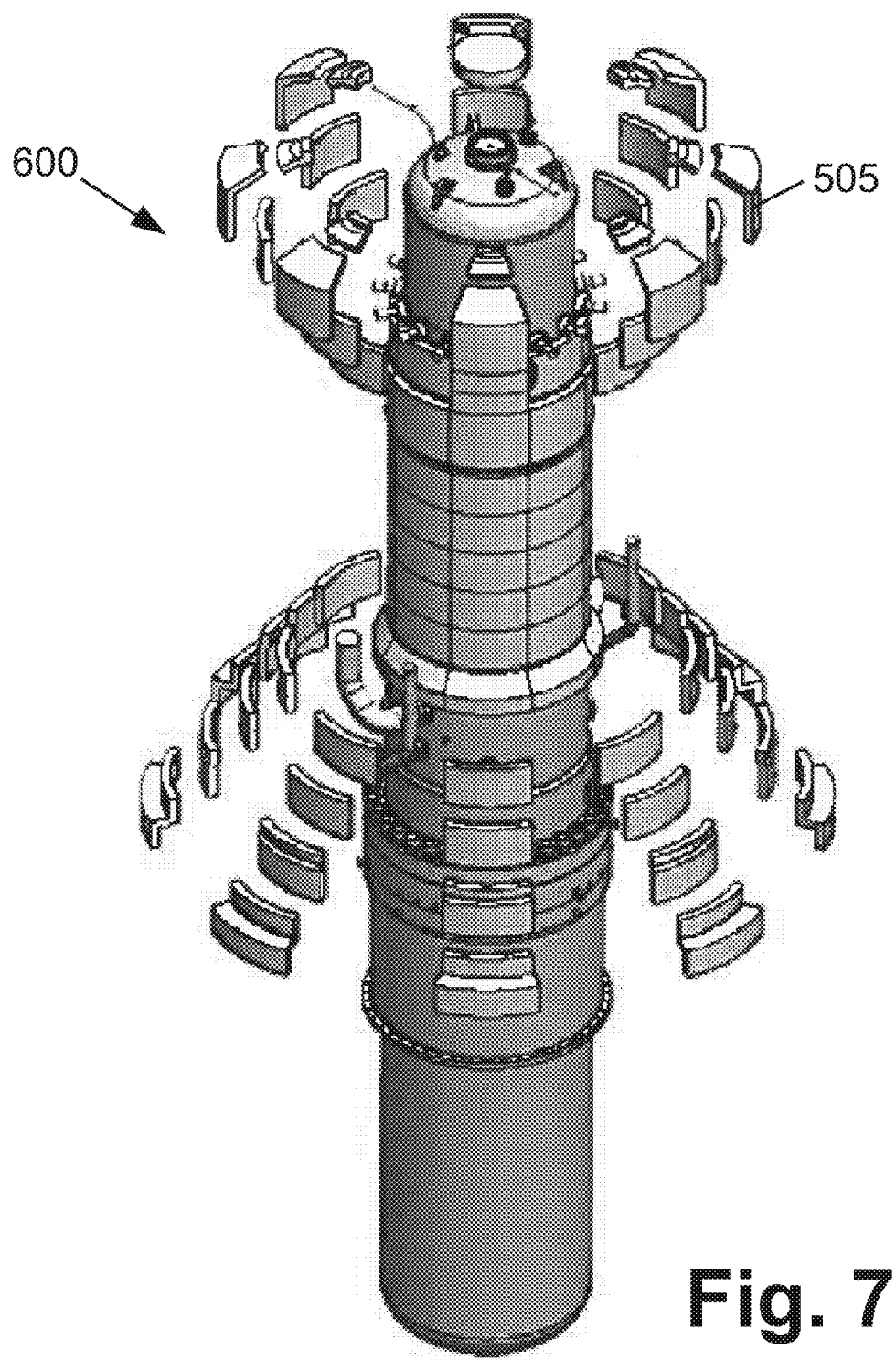

FIG. 7 diagrammatically shows the SMR in a state 600 with the insulation 505 partially removed, corresponding to operation 160 of FIG. 2.

Figure 8:
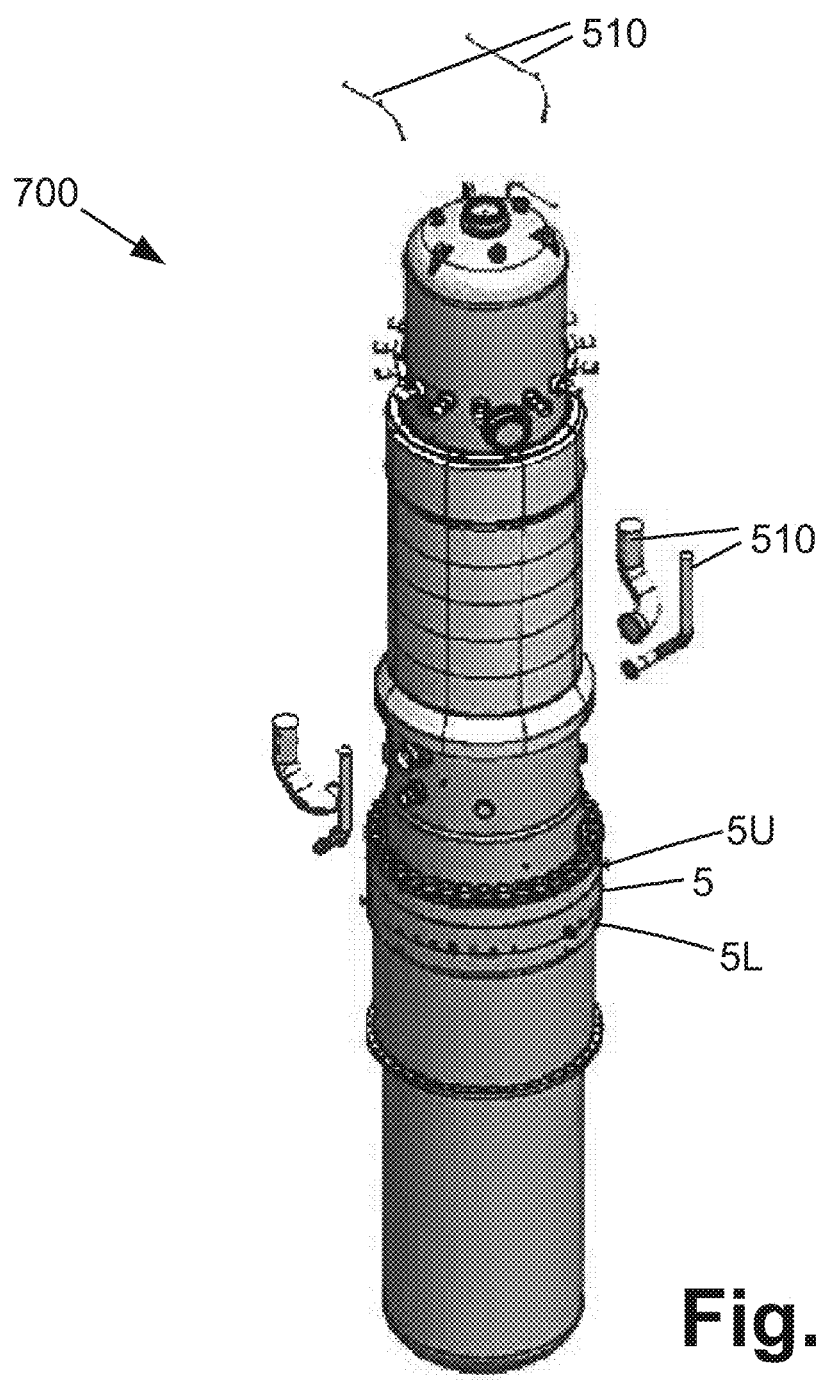

FIG. 8 diagrammatically shows the SMR in a state 700 with the insulation removed from the pressurizer, mid-flange, and lower vessel regions, and with upper vessel connections 510 detached. This state 700 corresponds to operation 170 of FIG. 2.

Figure 9:
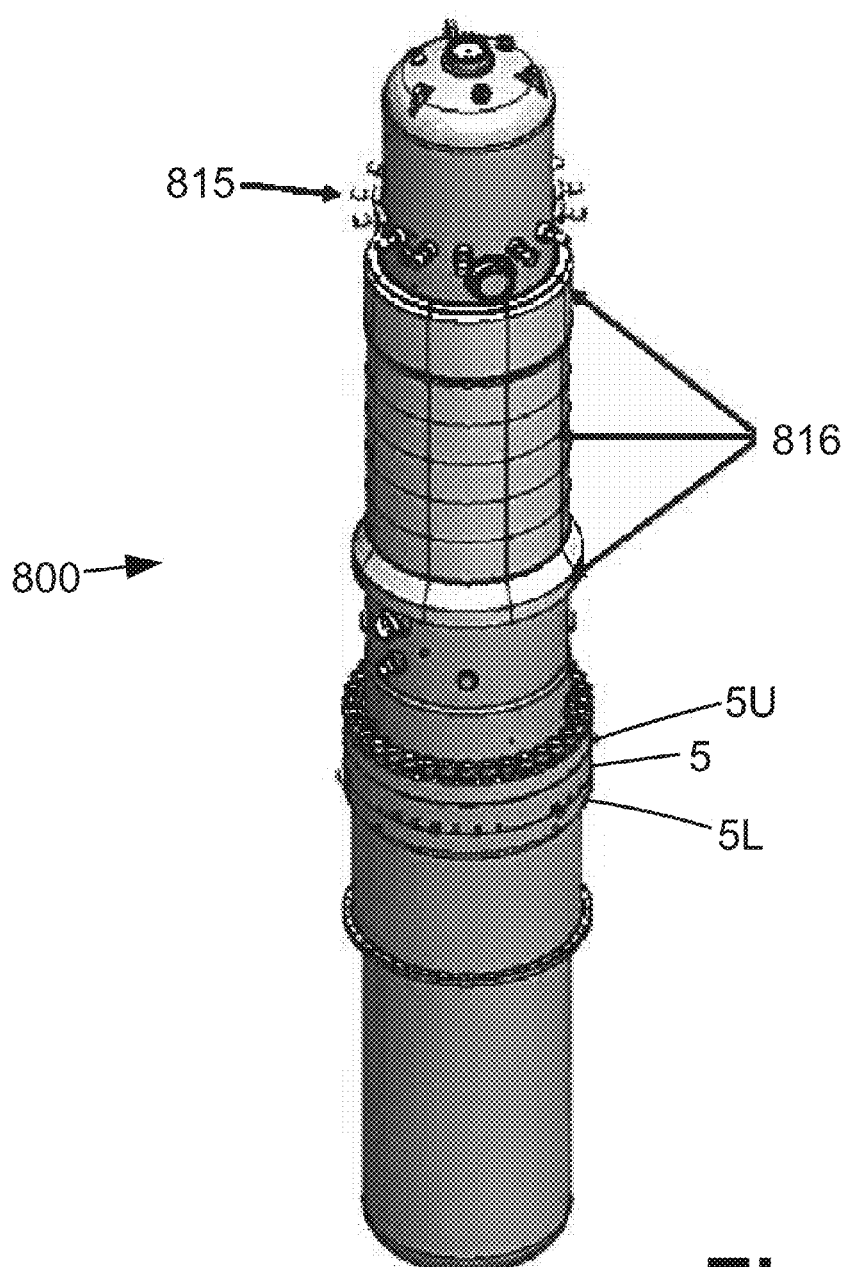

FIG. 9 diagrammatically shows the SMR in a state 800 with pressurized heater electrical connections 815 and instrumentation connections 816 partially removed. This state 800 corresponds to operation 210 of FIG. 3.

Figure 10:
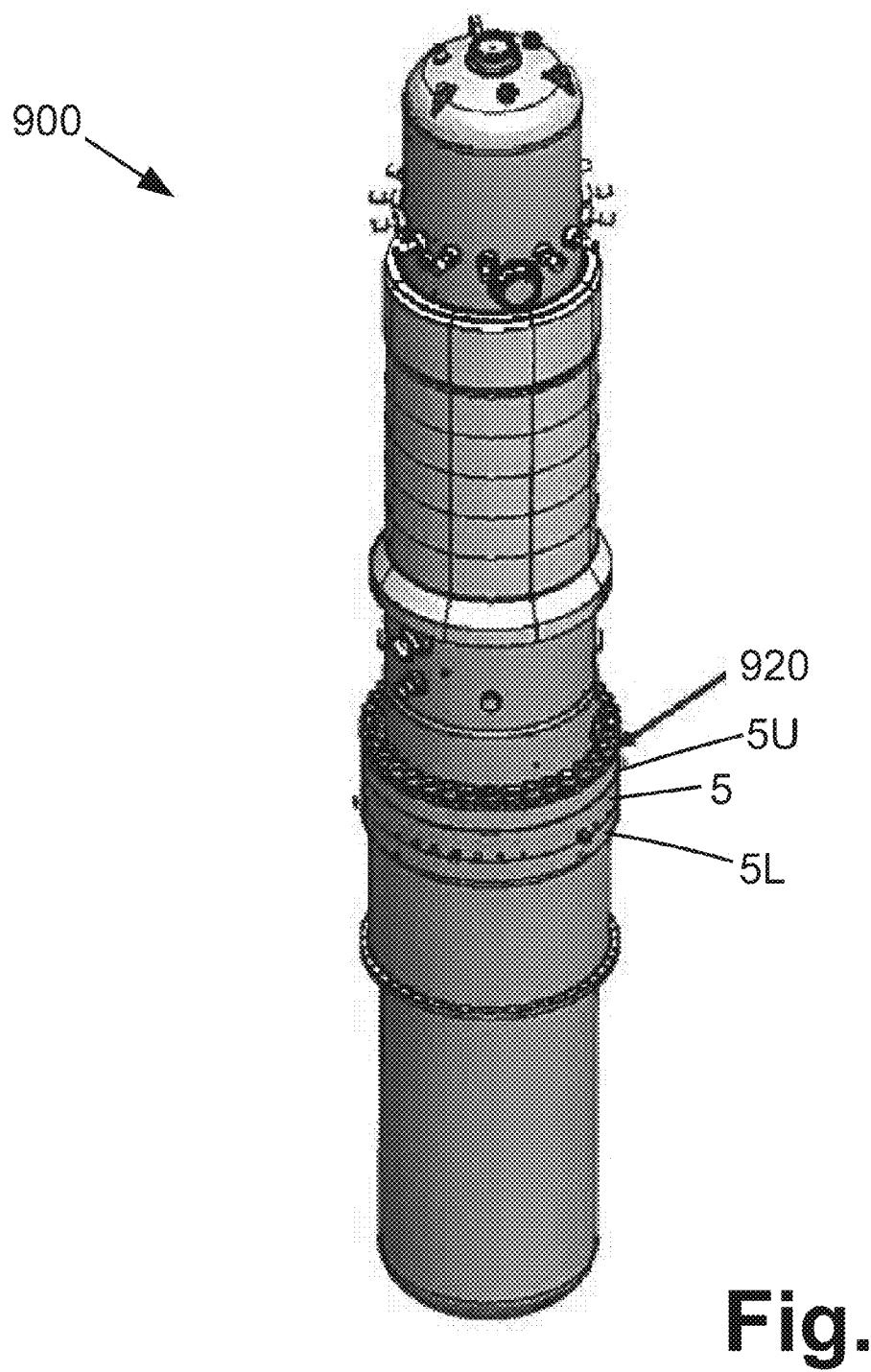

FIG. 10 diagrammatically shows the SMR in a state 900 corresponding to the alternative embodiment in which electrical and piping for the lower vessel assembly are routed down the side of the upper vessel and also ride with the upper vessel. FIG. 10 corresponds to further operation 215 of FIG. 3 in which the connections 920 through the mid-flange to the upper internals are broken.

Figure 11:
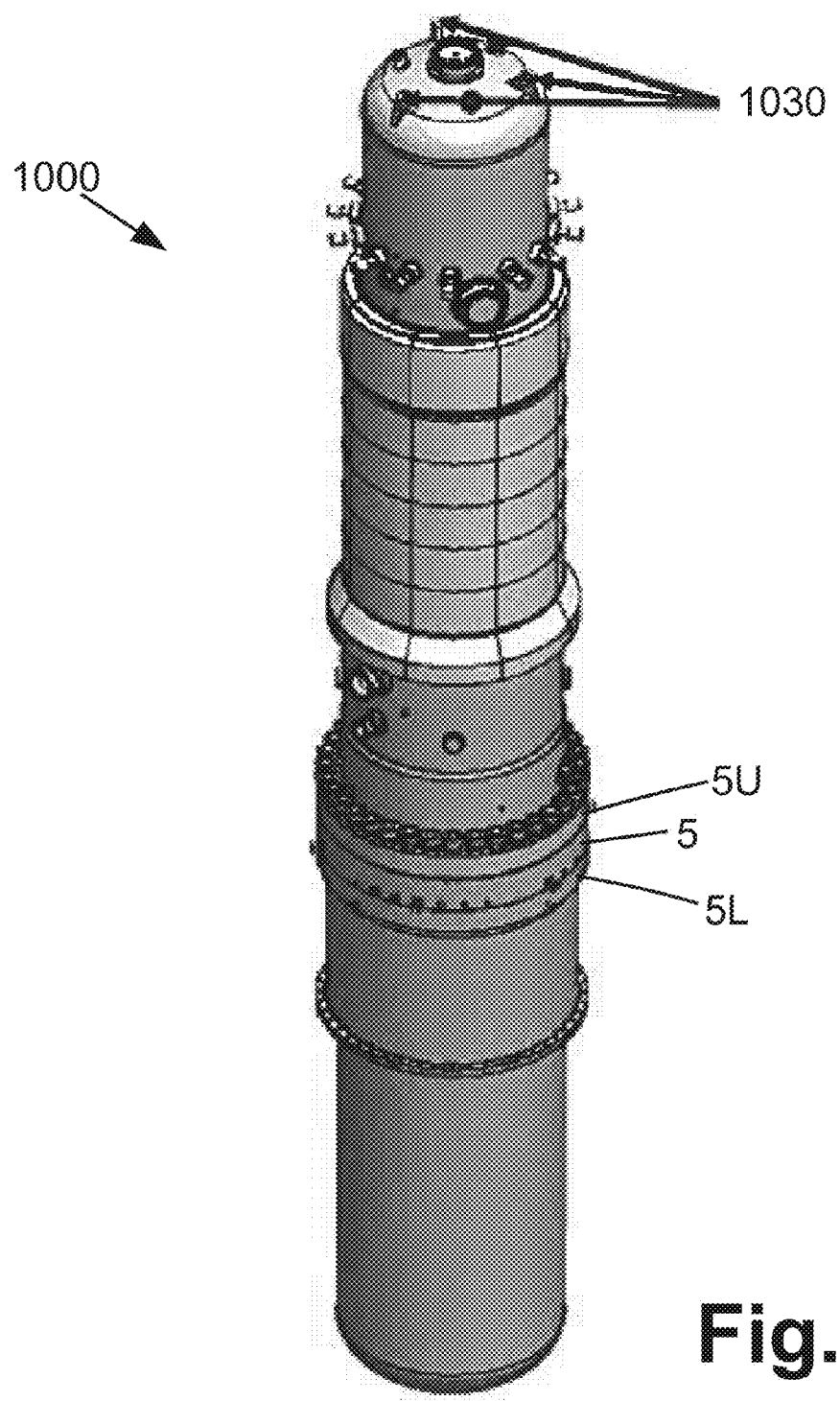

FIG. 11 diagrammatically shows the SMR in a state 1000, which is ready for hook-up with the upper vessel crane, i.e. operation 220 of FIG. 3. As seen in FIG. 11, the upper vessel includes upper vessel crane attachment points 1030 for attachment of the lifting crane (not shown).

Figure 12:
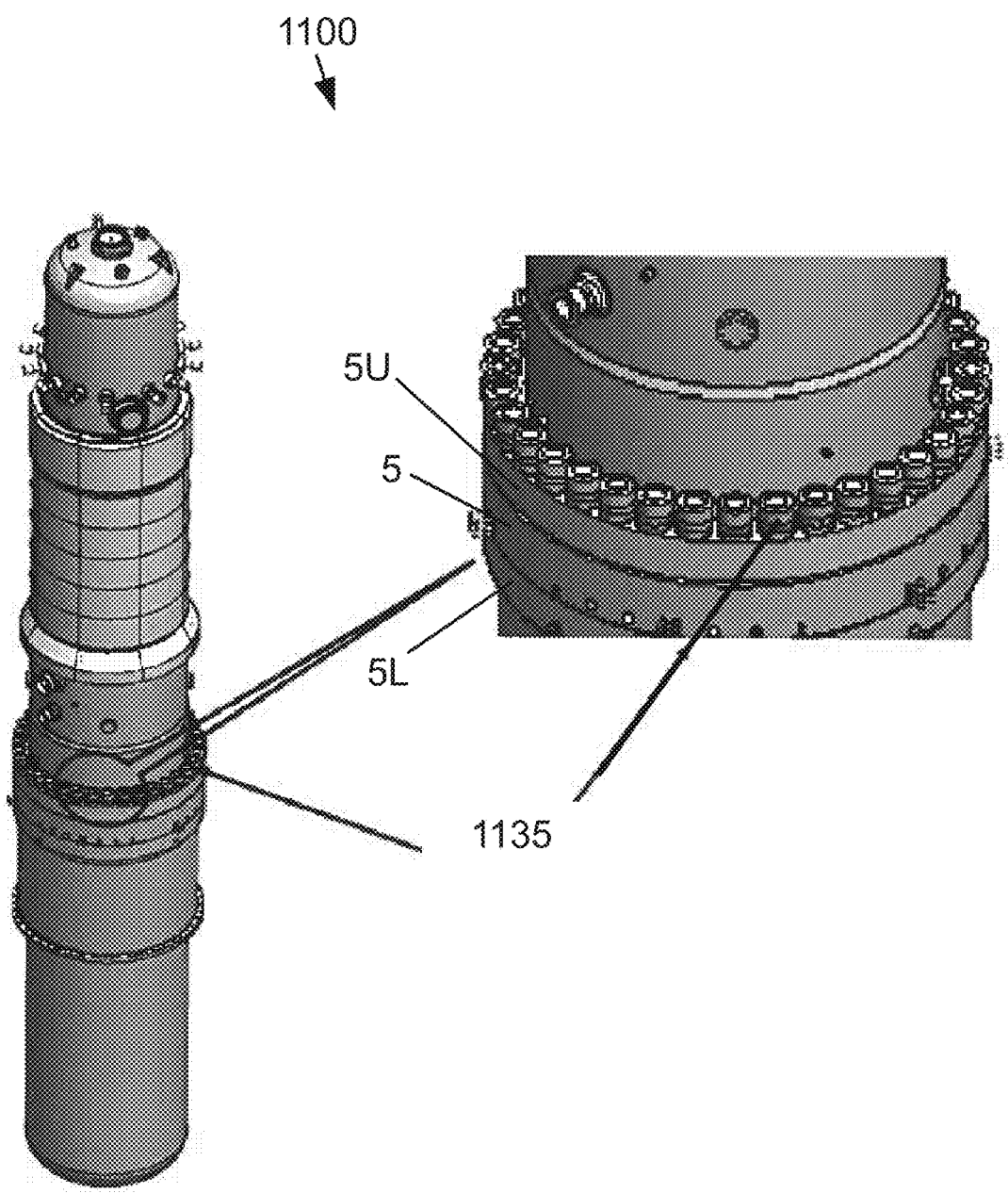

FIG. 12 diagrammatically shows the SMR in a state 1100 including reactor vessel nuts 1135 at the mid-flange 5 in tensioned position. The state 1100 corresponds to just before commencement of the nut detensioning operation 230 of FIG. 3.

Figure 13:
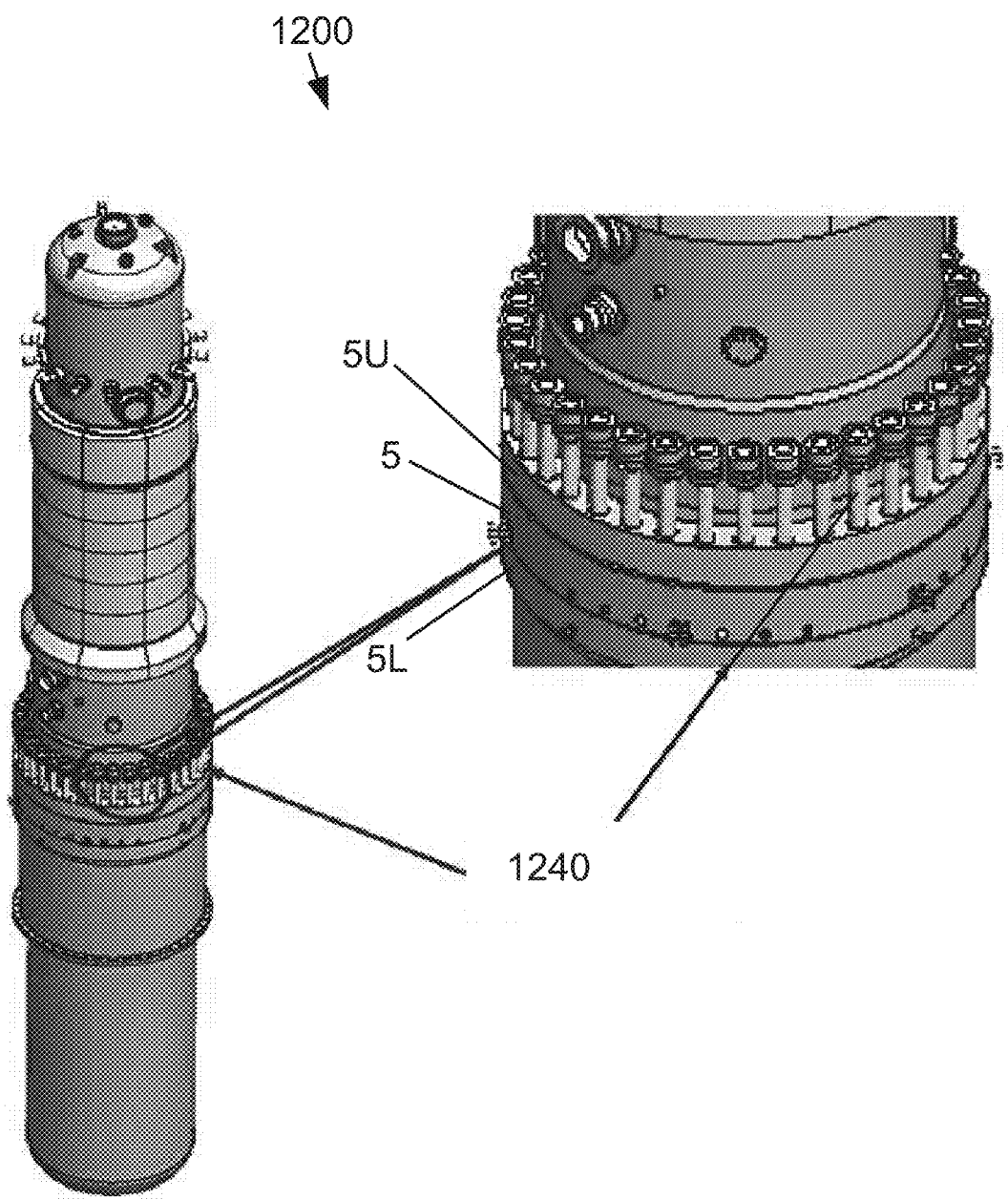

FIG. 13 diagrammatically shows the SMR in a state 1200 corresponding to immediately subsequent to the operation 240 of FIG. 3, with the reactor vessel studs 1240 backed out of the lower vessel flange 5L and parked in their transport positions in the upper vessel flange 5U. As indicated in alternative operation 245 of FIG. 3, the studs 1240 are alternatively completely removed and placed into a separate transport rack (variant not illustrated). An advantage of the approach of FIG. 13 in which the bolts remain at least partially inserted into the upper vessel flange 5U is that the bolts are not likely to be lost. (It is also contemplated to leave the fasteners parked at least partially inserted in the lower vessel flange rather than being parked at least partially inserted in the upper vessel flange 5L as shown in FIG. 13).

Figure 14:
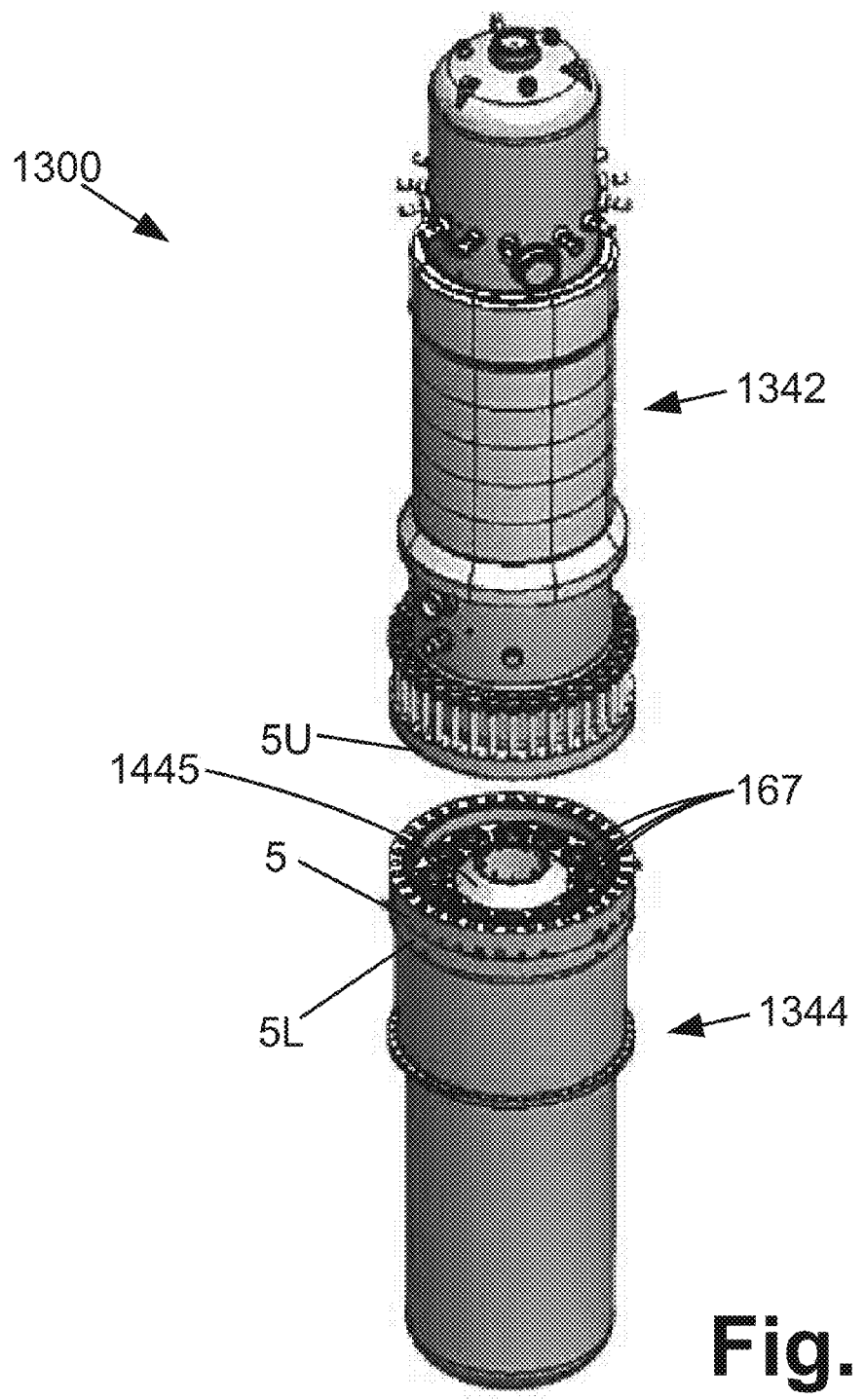

FIG. 14 diagrammatically shows the SMR in a state 1300 in which the upper vessel portion 1342 is lifted off the lower vessel portion 1344 via the crane lifting at the crane attachment points 1030 (labeled in FIG. 11; note that the drawings do not show the crane). The state 1300 of FIG. 14 corresponds to the operation 250 of FIG. 3. The upper vessel portion 1342 of the SMR of the illustrated refueling process is analogous to the upper vessel portion 4 of the SMR of FIG. 1, but does not include the RCPs 16; rather, the SMR of the illustrative refueling process includes wholly internal RCPs 167 which are part of the upper internals disposed in the lower vessel portion 1344 (corresponding to the lower vessel portion 3 of the SMR of FIG. 1 but sized to accommodate the RCPs 167). As seen in FIG. 14, the tops of the internal RCPs 167 are visible after lifting off the upper vessel portion 1342. Also visible is a riser cone 1445 that that provides the transition from the central riser 6 in the upper vessel portion (see FIG. 1) into the lower vessel portion. Instead of the illustrative riser cone, this transition could alternatively be cylindrical or otherwise shaped depending on the reactor design. It is to be appreciated that the internal steam generator (if present, e.g. steam generator 10 of the SMR of FIG. 1) is secured inside the upper vessel portion and is lifted off with the upper vessel portion 1342. Advantageously, this enables removal of the steam generator as a unit without disconnecting it from its mountings inside the pressure vessel. Similarly, in a reactor such as that of FIG. 1 in which the RCPs each comprise an external RCP motor 16 driving an impeller located in a RCP casing 17 disposed inside the pressure vessel, the RCPs 16, 17 are secured with the upper vessel portion and are optionally removed as a unit together with the upper vessel portion. (Alternatively, the RCPs 16, 17 or portions thereof, e.g. the motors 16, are removed prior to lifting off the upper vessel section).

As further seen in FIG. 14, the mid-flange 5 remains in place atop the lower flange 5L of the lower vessel portion 1344. The weight of the mid-flange 5 together with the weight of the suspended upper internals ensures that this component is held firmly in place during liftoff of the upper vessel portion.

The next operations perform removal of the mid-flange 5 and the upper internals that are suspended from the mid-flange 5.

Figure 15:
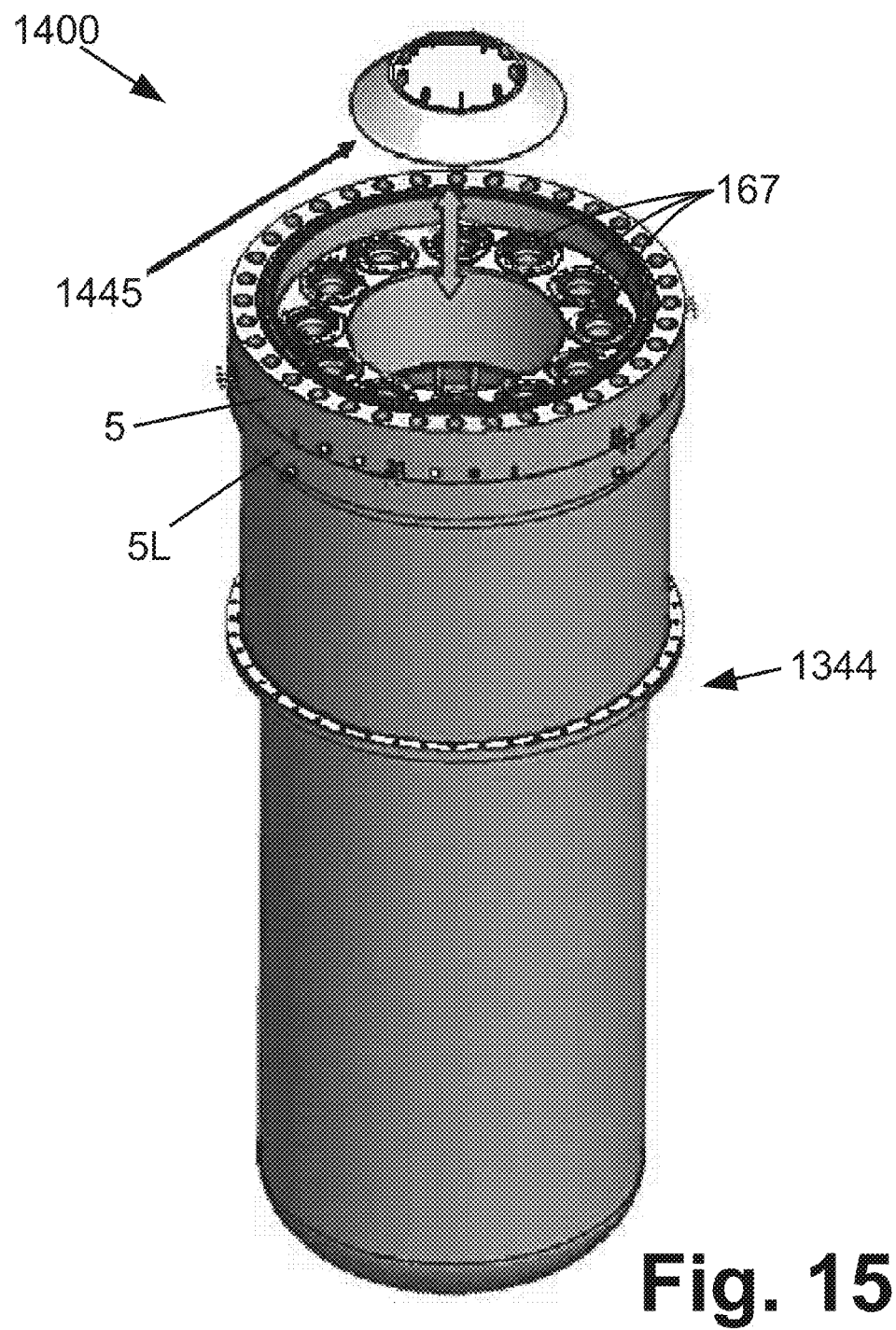

FIG. 15 diagrammatically shows the SMR in a state 1400. In FIG. 15 and subsequently, the upper vessel portion 1342 is not shown, it having been moved off to the upper vessel maintenance stand (not shown) in the upper vessel liftoff operation 250 of FIG. 3. The state shown in FIG. 15 corresponds to operation 310 of FIG. 4, that is, to removal of the riser cone 1445 from the upper internals.

Figure 16:
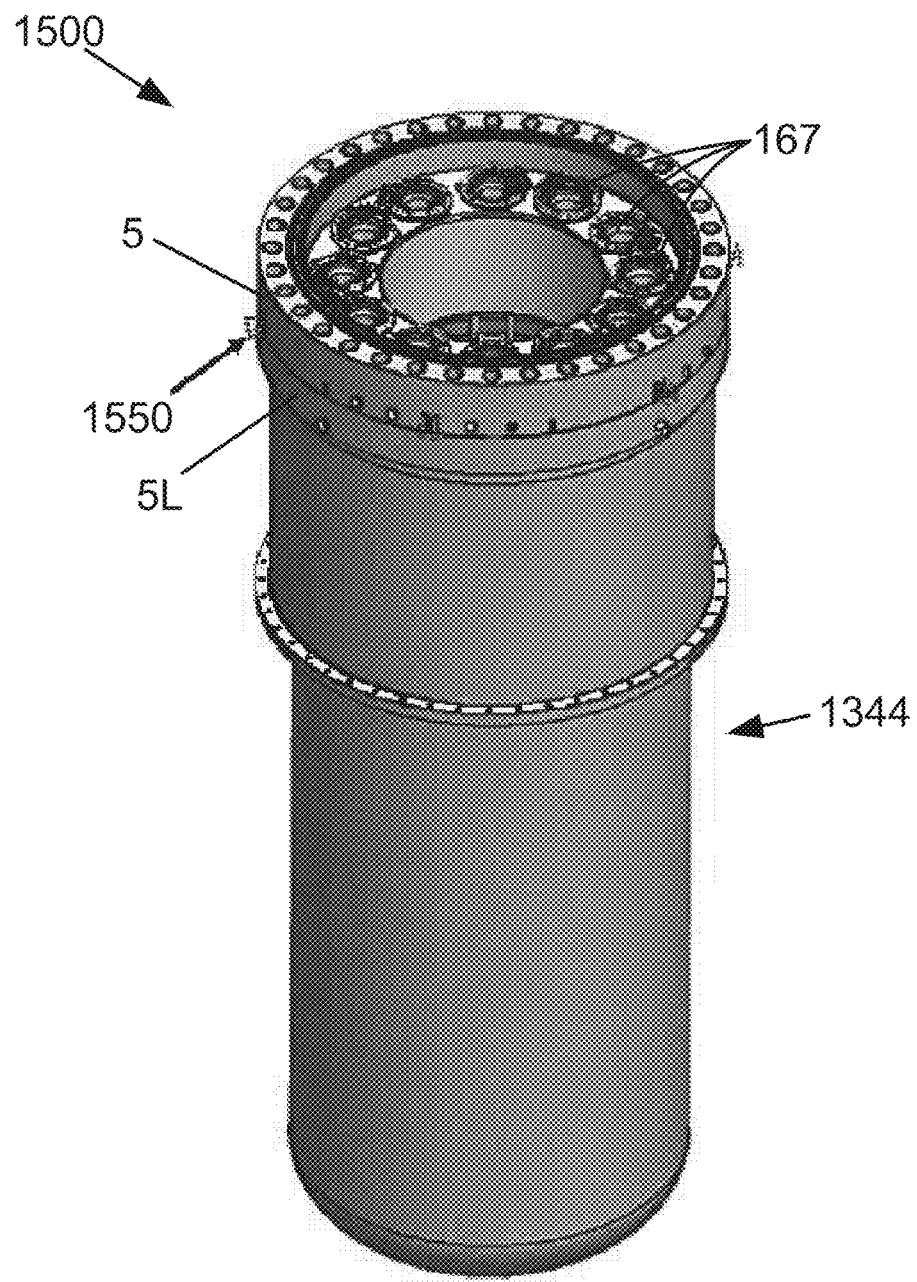

FIG. 16 diagrammatically shows the SMR in a state 1500 corresponding to the operation 320 of FIG. 4, in which external connections 1550 around the mid-flange are disconnected.

Figure 17:
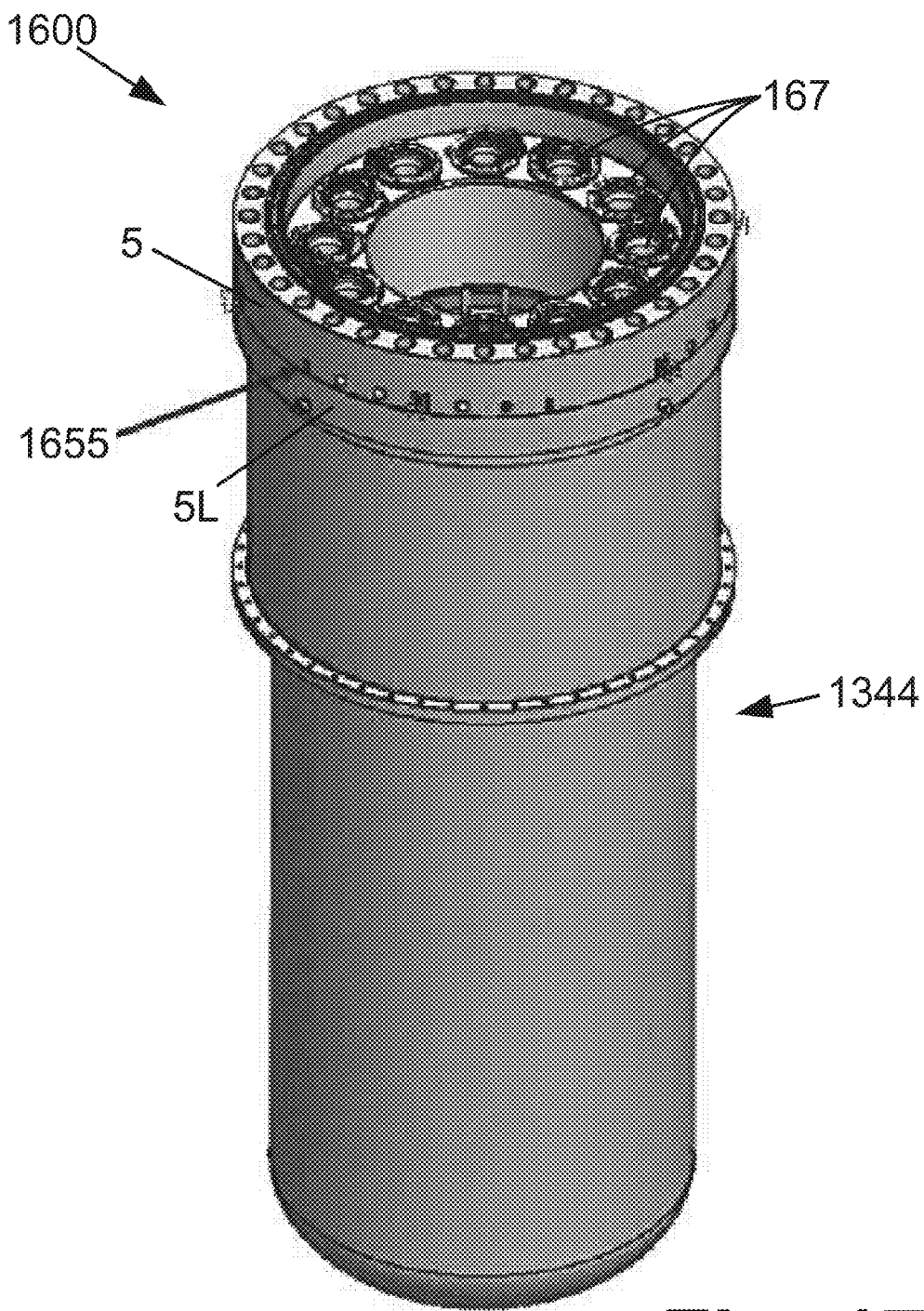

FIG. 17 diagrammatically shows the SMR in a state 1600 corresponding to the operation 330 of FIG. 4 in which the incore instruments (not shown) are pulled through vessel penetrations 1655 of the mid-flange 5 and wrapped around the mid-flange 5 or otherwise secured with the mid-flange 5.

Figure 18:
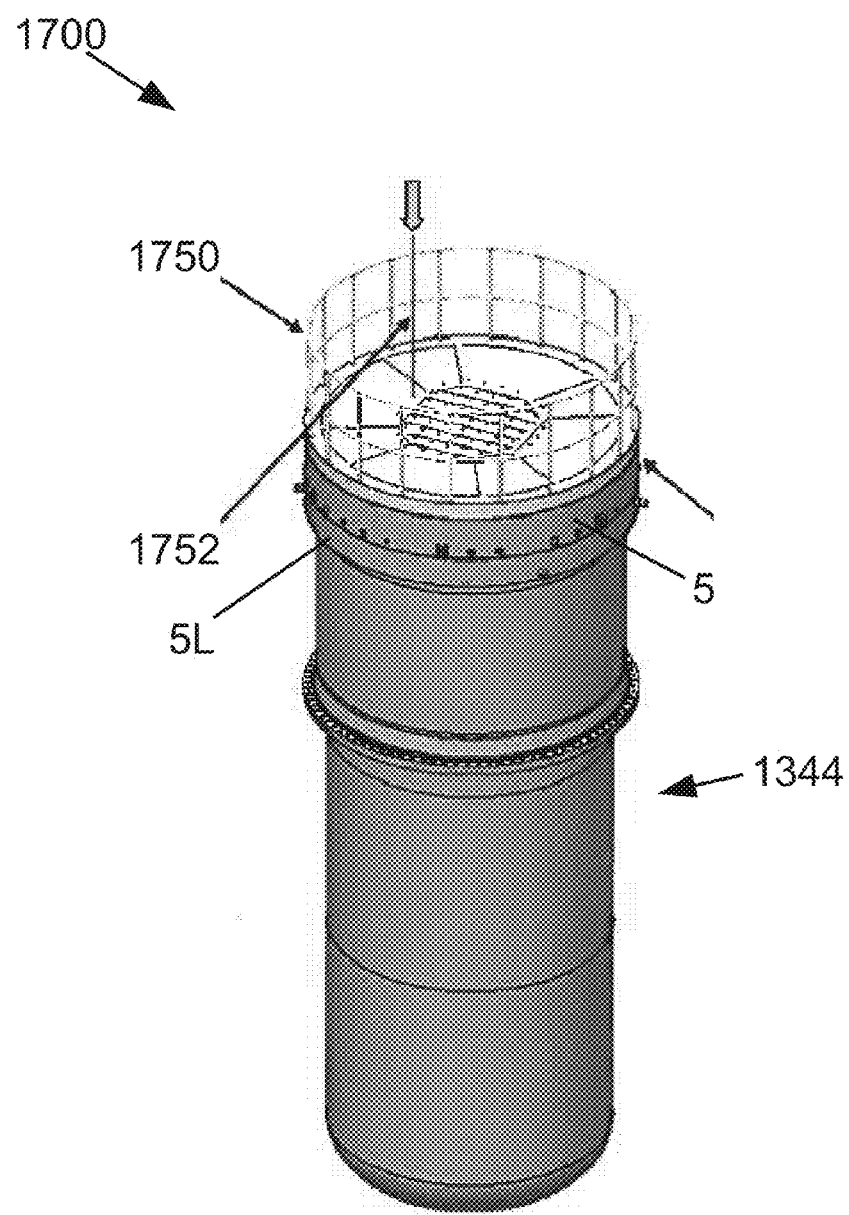

FIG. 18 diagrammatically shows the SMR in a state 1700 corresponding to the operations 340, 350, 360 of FIG. 4. An upper internals refueling platform 1750 is delivered (if not already on-site) and positioned on the mid-flange 5 as per operation 340. A suitable tool 1752 is employed in operation 350 to disconnect the control rods from the control rod drive mechanisms (CRDMs). It is to be appreciated that as part of the reactor shutdown sequence 110 (FIG. 2), the control rods were fully inserted into the reactor core in order to extinguish the nuclear chain reaction. Operation 350 serves to disconnect the CRDMs 8 (see FIG. 1), and a crane (not shown) is hooked up to the upper internals in operation 360. This hookup suitably employs the mid-flange 5 as the anchor point for hooking up the crane (not shown).

Figure 19:
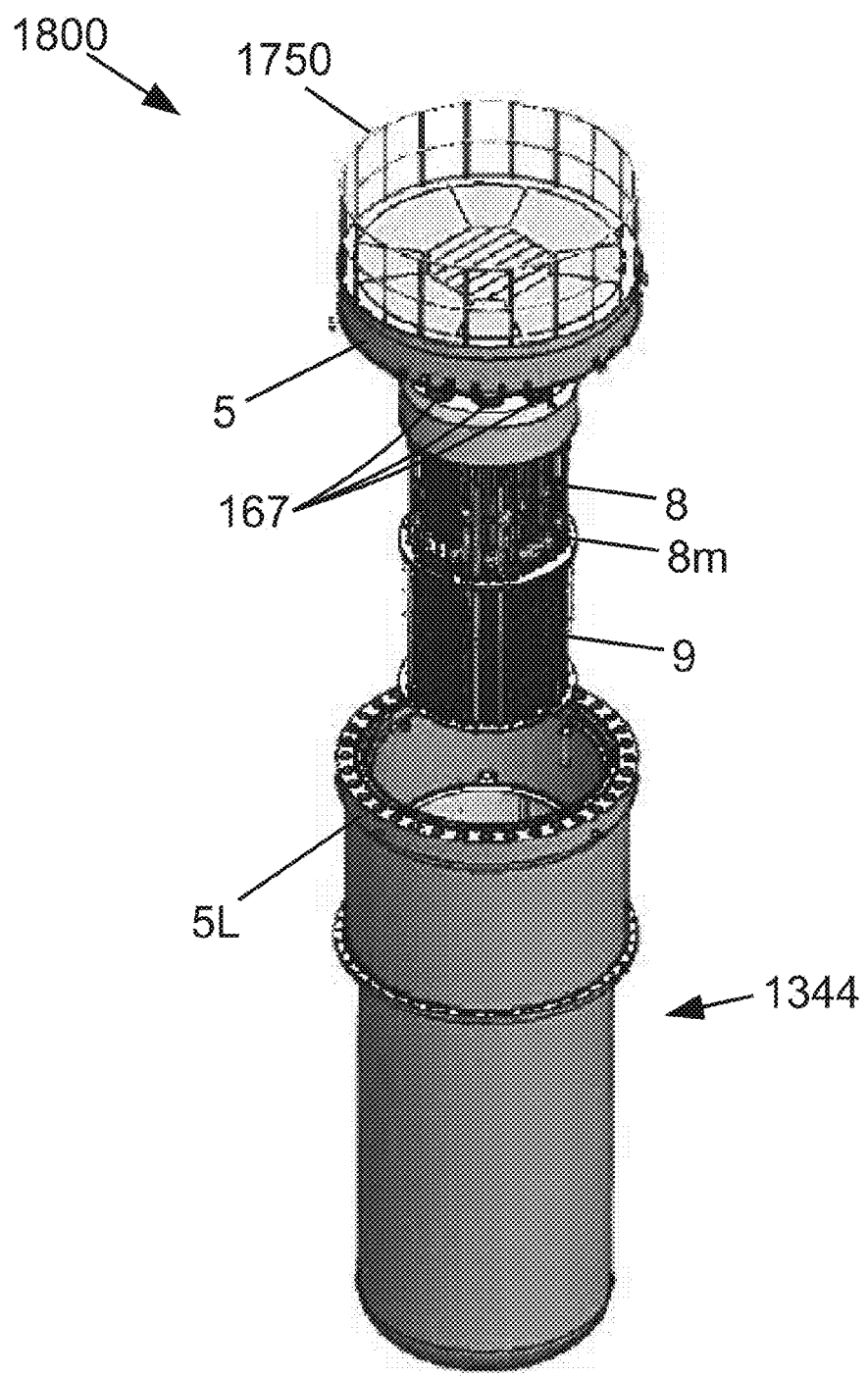

FIG. 19 diagrammatically shows the SMR in a state 1800 corresponding to operation 420 of FIG. 5, i.e. to the lifting out of the mid-flange 5 with the upper internals suspended therefrom. In the SMR of the illustrated refueling process, the suspended upper internals include the CRDMs 8 (including the internal CRDM motors 8m), the guide frames 9, and the internal RCPs 167 (only the bottoms of few of which are visible in FIG. 19). The upper internals 8, 9, 167 are removed as a unit, again advantageously avoiding breakdown of these intricate assemblies.

In the alternative SMR of FIG. 1, the suspended upper internals include the CRDMs 8 (and motors 8m) and the guide frames 9, but do not include the RCPs. Rather, as seen in FIG. 1, in that embodiment the RCPs (each comprising a motor 16 and impeller in RCP casing 17) are mounted proximate to the pressurizer 14. Thus in this embodiment the upper internals 8, 9 are removed as a unit.

FIG. 19 shows the mid-flange 5 with the upper internals 8, 9, 167 remaining suspended from the mid-flange 5, and the refueling bridge or platform 1750 mounted on the mid-flange 5, with this complete assembly lifted vertically out of the lower vessel section 1344. The assembly is suitably then moved laterally (possibly with vertical adjustments as needed) to an upper internals maintenance stand (not shown). With the upper internals removed, the lower vessel 1344 remains with a large opening encircled by the lower flange 5L through which refueling can be performed.

Advantageously, the removal of the upper internals suspended from the mid-flange 5 is efficient, as the CRDMs and guide frames do not need to be individually dismounted and removed. The mid-flange 5 provides a suitable support. Additionally, in embodiments in which the electrical (and, if needed, hydraulic) lines penetrate the pressure vessel through the mid-flange 5, the cables external to the pressure vessel are removed (see FIGS. 10 and 16 and operations 215, 320 of FIGS. 3 and 4 respectively), but the electrical (and hydraulic) cabling internal to the pressure vessel and running from the mid-flange 5 to the CRDM motors 8m can remain in place, further reducing the number of operations needed to remove the upper internals.

Figure 21:
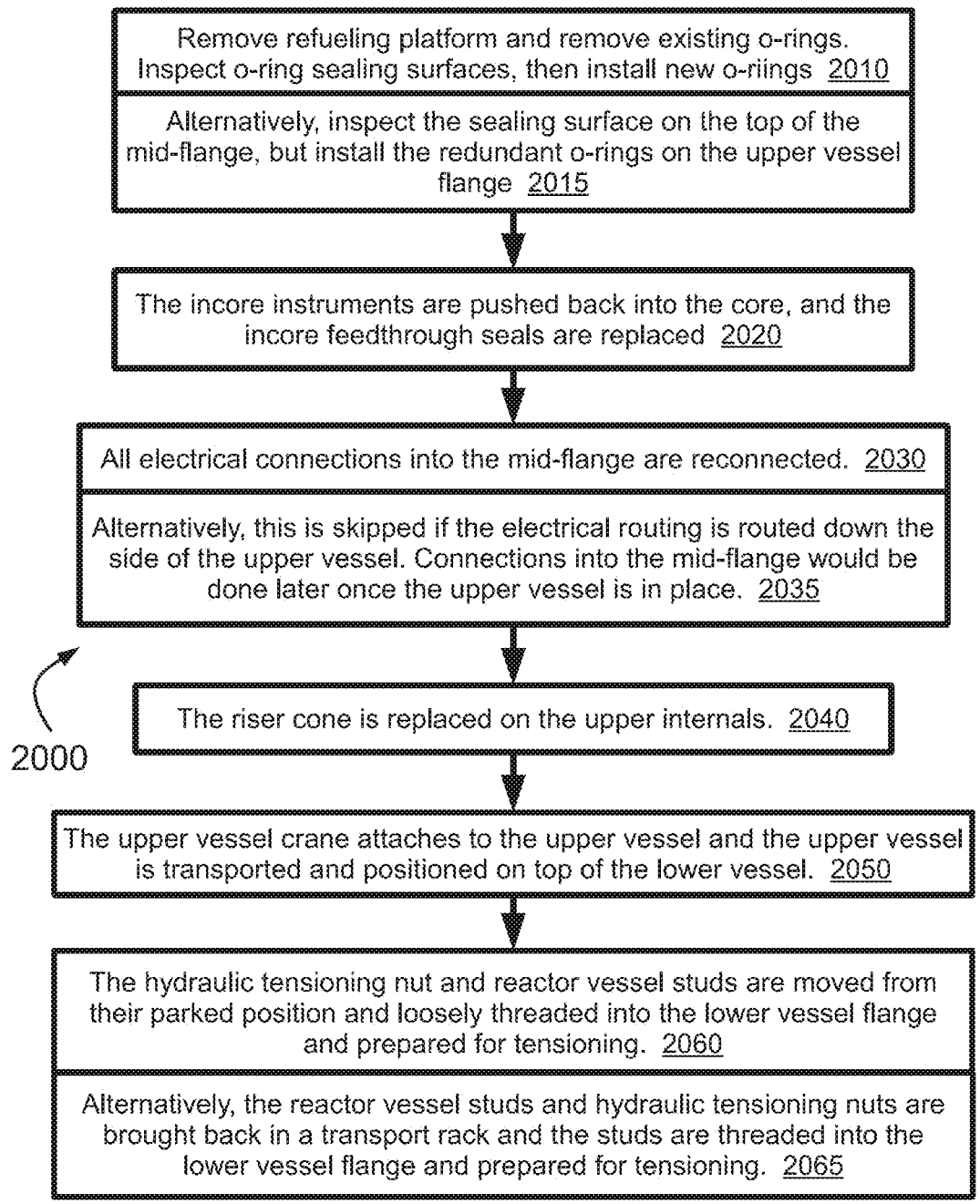
Figure 22:
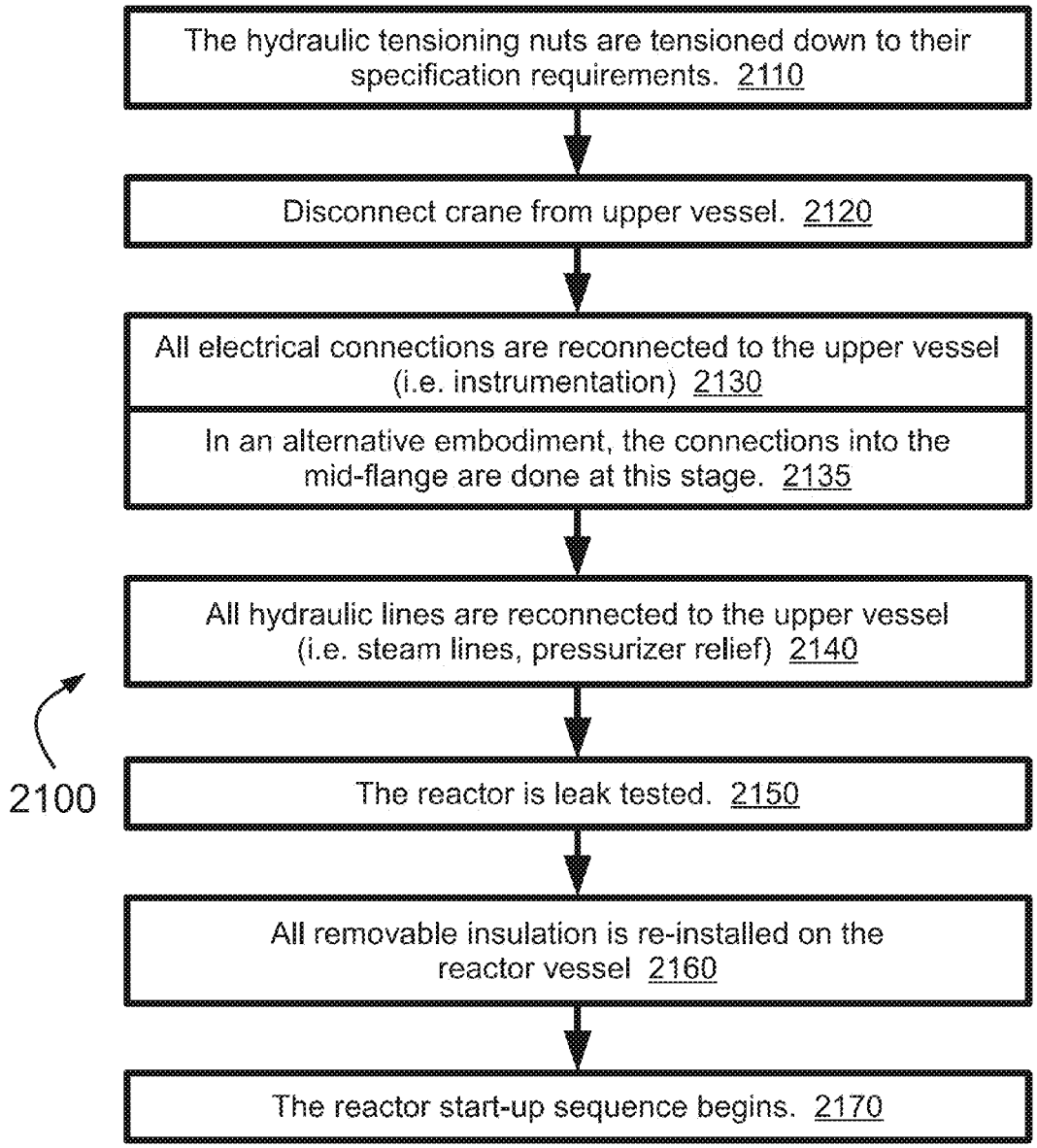

With reference to FIGS. 20-22, the refueling and restart operations are flowcharted.

FIG. 20 illustrates a first portion 1900 of this process. Operation 1910 is the spent fuel removal operation. A refueling crane is brought in and removes the spent fuel, which is transported through a refueling canal to a fuel transport system and then transported to the spent fuel pool (ancillary components not shown). The spent fuel is preferably removed in operation 1910 before new fuel is brought in, and then in an operation 1920 new fuel assemblies are transported through the refueling canal, removed from the fuel transport system, and placed by the crane into the lower vessel 1344 to assemble the fresh nuclear reactor core inside the lower vessel 1344. In an operation 1930, mid-flange standoffs are installed onto the lower vessel flange. New o-rings are placed onto the surface of the lower vessel in an operation 1940. The upper internals and refueling platform are placed onto standoffs in sequence with the refueling canal being drained in an operation 1950. Existing o-rings are removed, the o-ring sealing surfaces are inspected, and the new O-rings are installed, in an operation 1960. Alternatively, the o-rings are installed on the lower vessel flange but not the mid-flange (alternative operation 1965 of FIG. 20). The upper internals are lifted and removed from standoffs in an operation 1970. The upper internals are lowered onto the lower vessel and control rods are reconnected to the control rod drive mechanism (CRDM) with a connection tool in an operation 1980.

FIG. 21 illustrates the continuation 2000 of the process. The refueling platform and existing o-rings are removed, the sealing surfaces are inspected, and new o-rings installed in an operation 2010. In some embodiments, redundant o-rings are installed on the upper vessel flange in an operation 2015. The incore instruments are pushed back into the core and incore feedthrough seals are replaced in an operation 2020. The electrical connections into the mid-flange are reconnected in an operation 2030. If appropriate for the reactor design, connections into the mid-flange are also completed after the upper vessel is in place in an operation 2035. The riser cone is replaced on the upper internals in an operation 2040. The upper vessel crane is attached to the upper vessel and the upper vessel is transported and positioned on top of the lower vessel in an operation 2050. The hydraulic tensioning nut and reactor vessel studs are moved from their parked position and loosely threaded into the lower vessel flange and prepared for tensioning in an operation 2060. If the studs were removed completely (as per optional operation 245 of FIG. 3), then the reactor vessel studs and hydraulic tensioning nuts are brought back in a transport rack in alternative operation 2065. The studs may be threaded into the lower vessel flange and prepared for tensioning.

FIG. 22 illustrates the continuation 2100 of the process. The hydraulic tensioning nuts are tensioned to their specification requirements in an operation 2110. The crane is disconnected from the upper vessel in an operation 2120. Electrical connections (i.e. instrumentation) are reconnected to the upper vessel in an operation 2130, or alternatively are reconnected into the mid-flange (alternative operation 2135). The hydraulics (i.e. steam lines and pressurizer relief) are reconnected to the upper vessel in an operation 2140. The reactor is leak tested in an operation 2150. The removable insulation is reinstalled on the reactor vessel in an operation 2160. The reactor startup sequence is initiated in an operation 2170.

With reference to FIGS. 23-30, further states of the SMR of the illustrative refueling are shown during the refueling/restart process of FIGS. 20-22.

Figure 23:
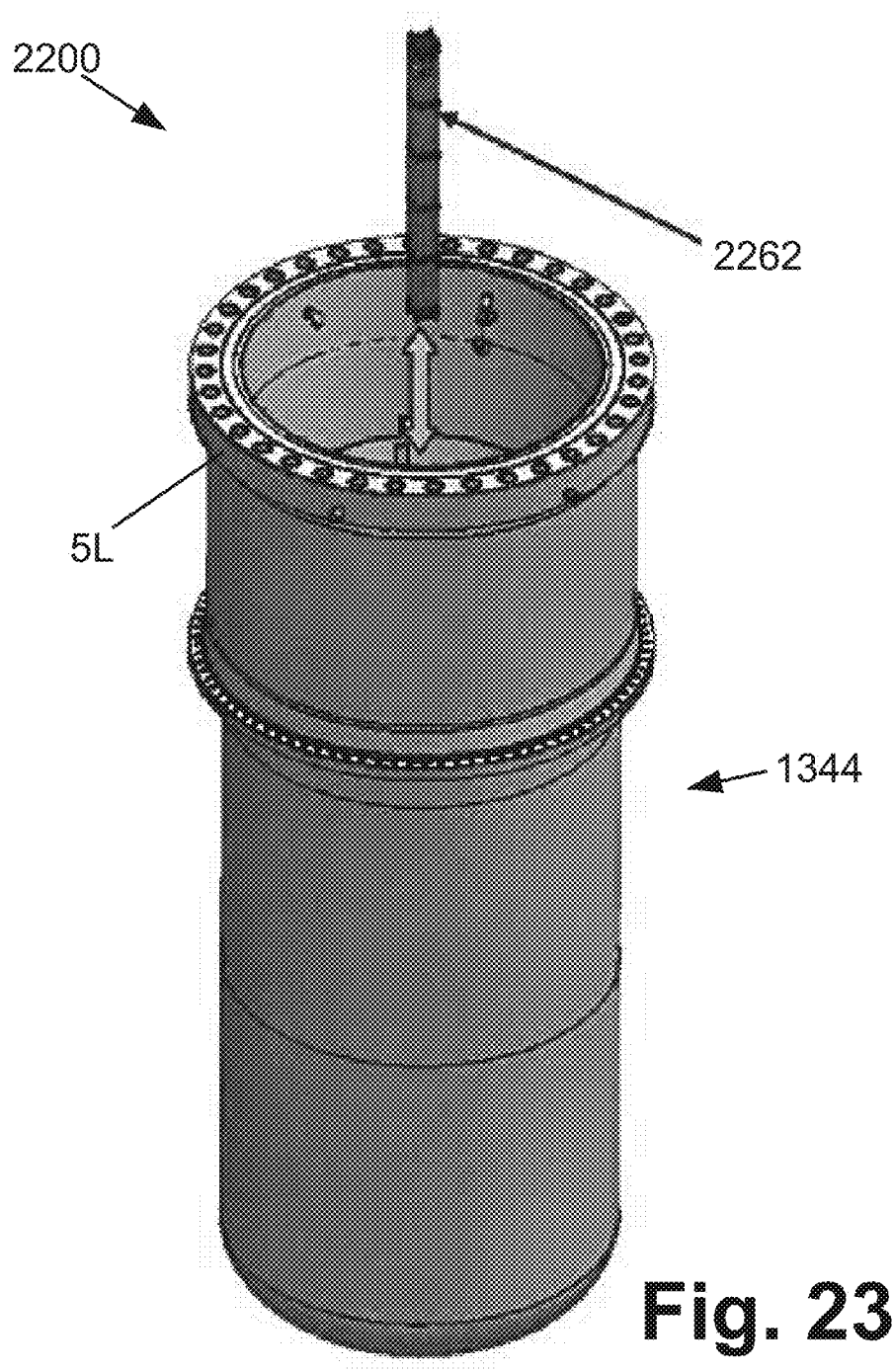
FIGS. 23-30 illustrate the SMR of FIGS. 6-19 at various stages of the refueling and restart sequences of FIGS. 20-22.

FIG. 23 diagrammatically shows the SMR in a state 2200 corresponding to the operations 1910, 1920 of FIG. 20. FIG. 23 shows an illustrative fuel assembly 2262 being unloaded (for operation 1910) or loaded (for operation 1920).

Figure 24:
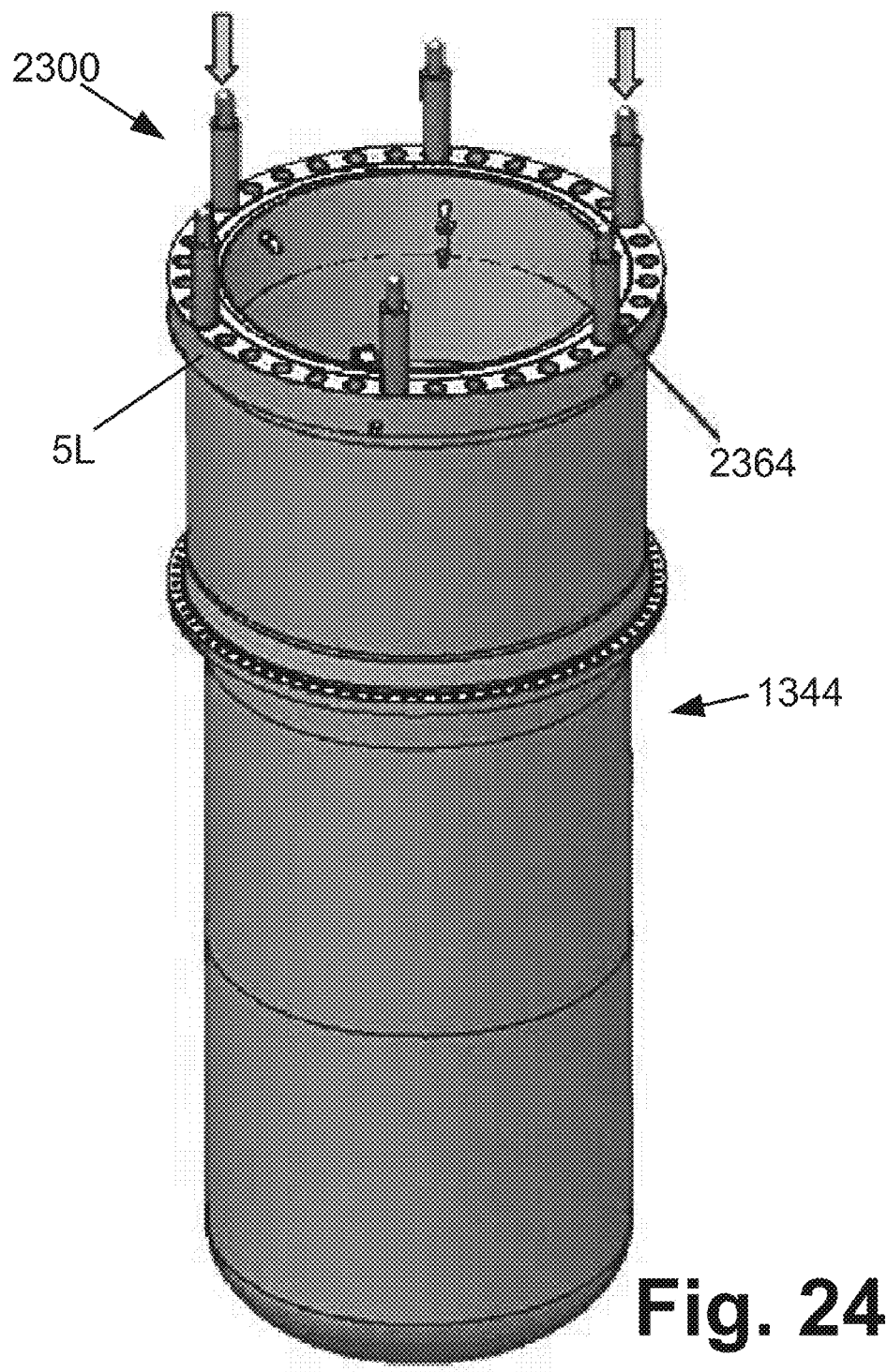

FIG. 24 diagrammatically shows the SMR in a state 2300 corresponding to the operation 1930 of FIG. 20 in which standoffs 2364 are installed onto the lower vessel flange 5L of the lower vessel 1344.

Figure 25:
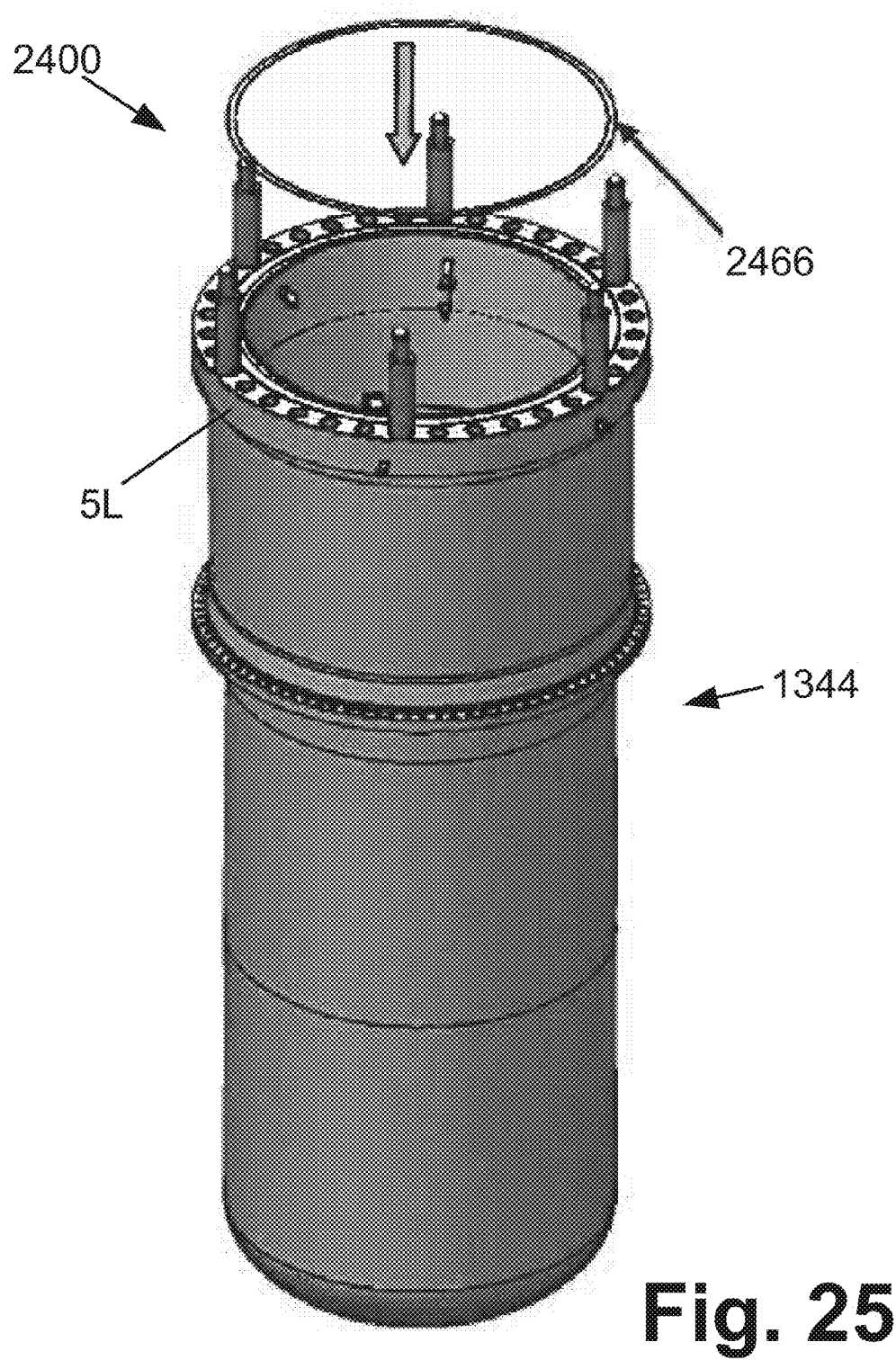

FIG. 25 diagrammatically shows the SMR in a state 2400 corresponding to the operation 1940 of FIG. 20 in which a new o-ring 2466 is placed onto the surface of the lower vessel flange 5L of the lower vessel 1344.

Figure 26:
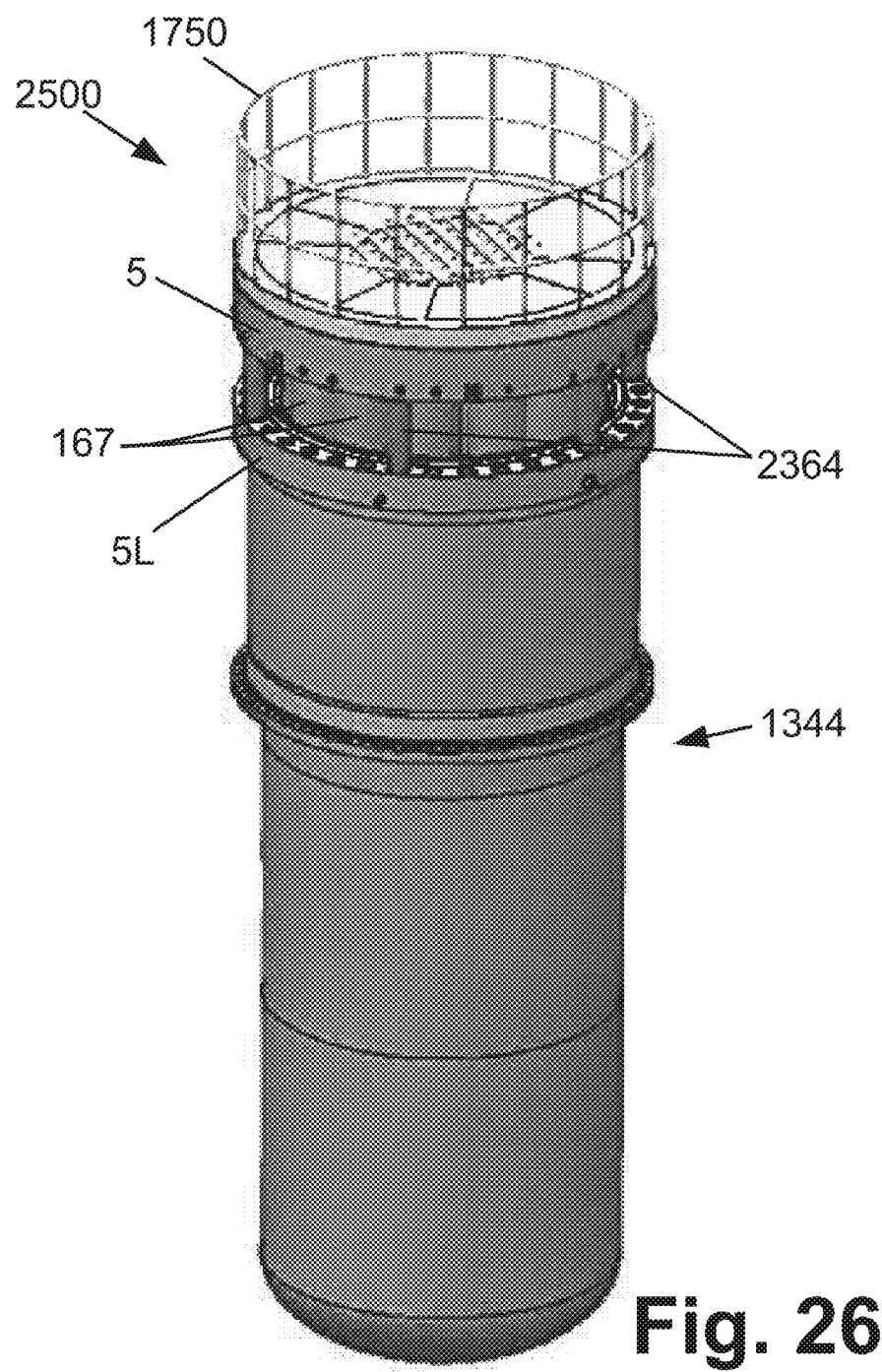

FIG. 26 diagrammatically shows the SMR in a state 2500 corresponding to the operation 1950 of FIG. 20 in which the mid-flange 5 (with the upper internals suspended from the mid-flange 5) is placed onto the standoffs 2364.

Figure 27:
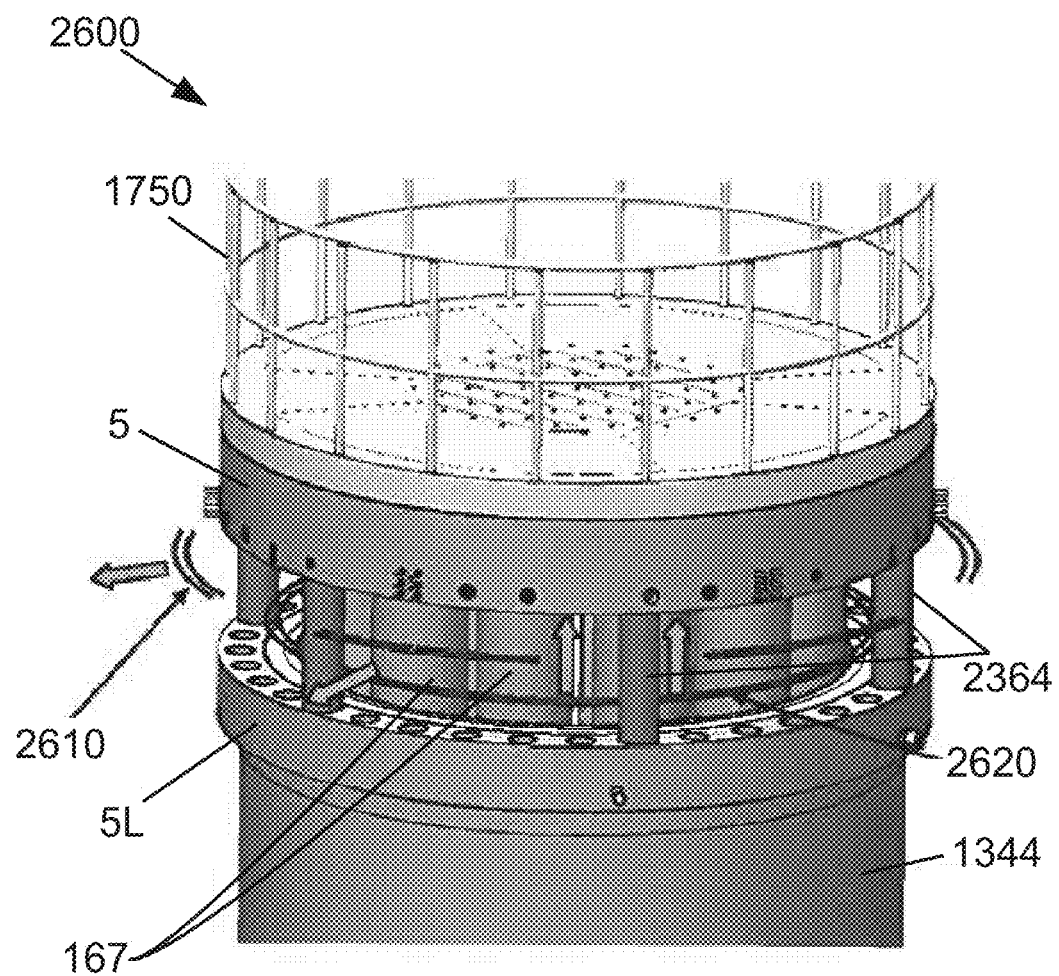

FIG. 27 diagrammatically shows the SMR in a state 2600 corresponding to the operation 1960 of FIG. 20. The old o-rings 2610 are cut and removed, and new o-rings 2620 are installed.

Figure 28:
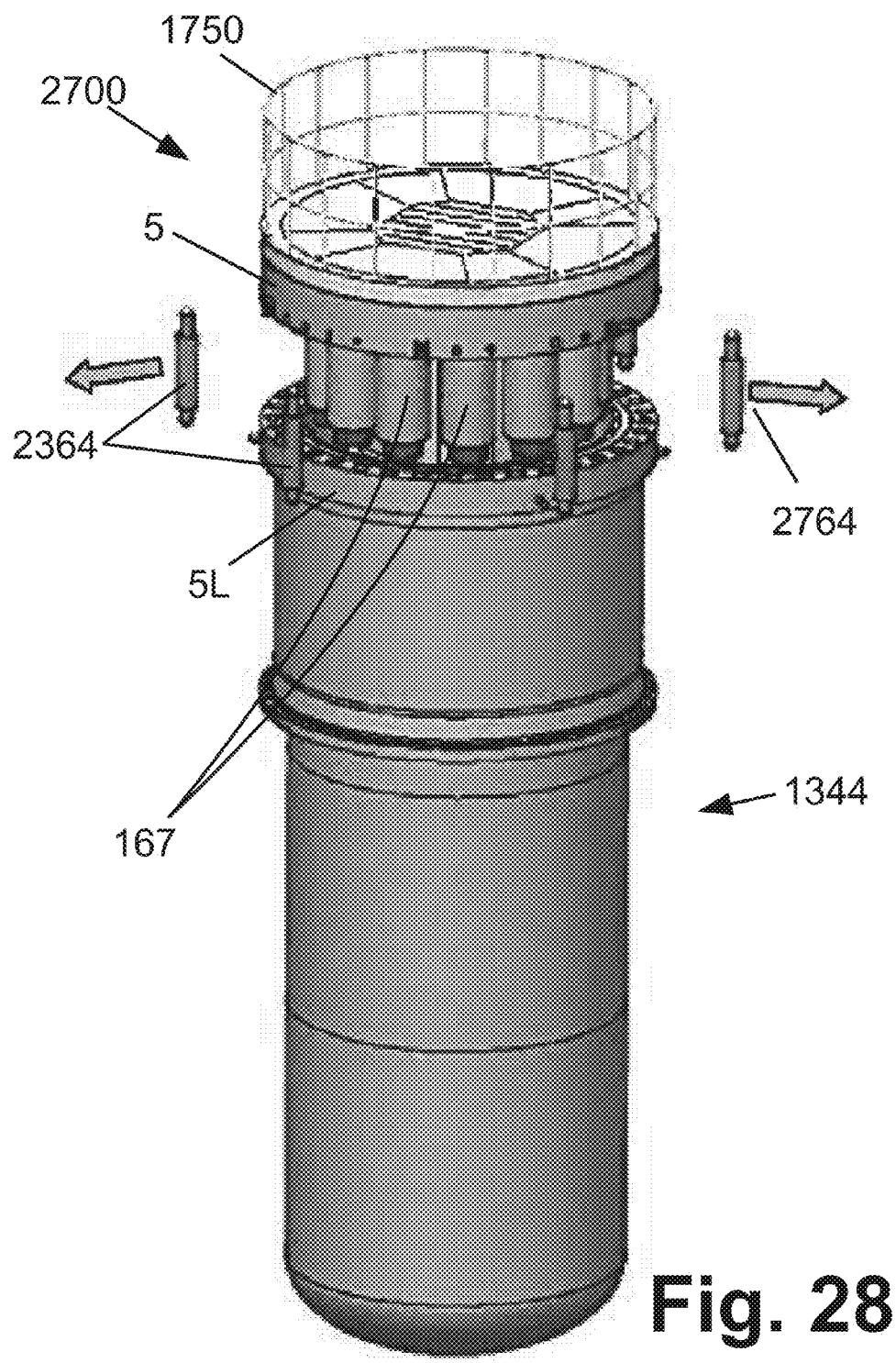

FIG. 28 diagrammatically shows the SMR in a state 2700 corresponding to the operation 1970 of FIG. 20 in which the mid-flange 5 (with the upper internals suspended therefrom) is lifted and the standoffs 2764 removed.

Figure 29:
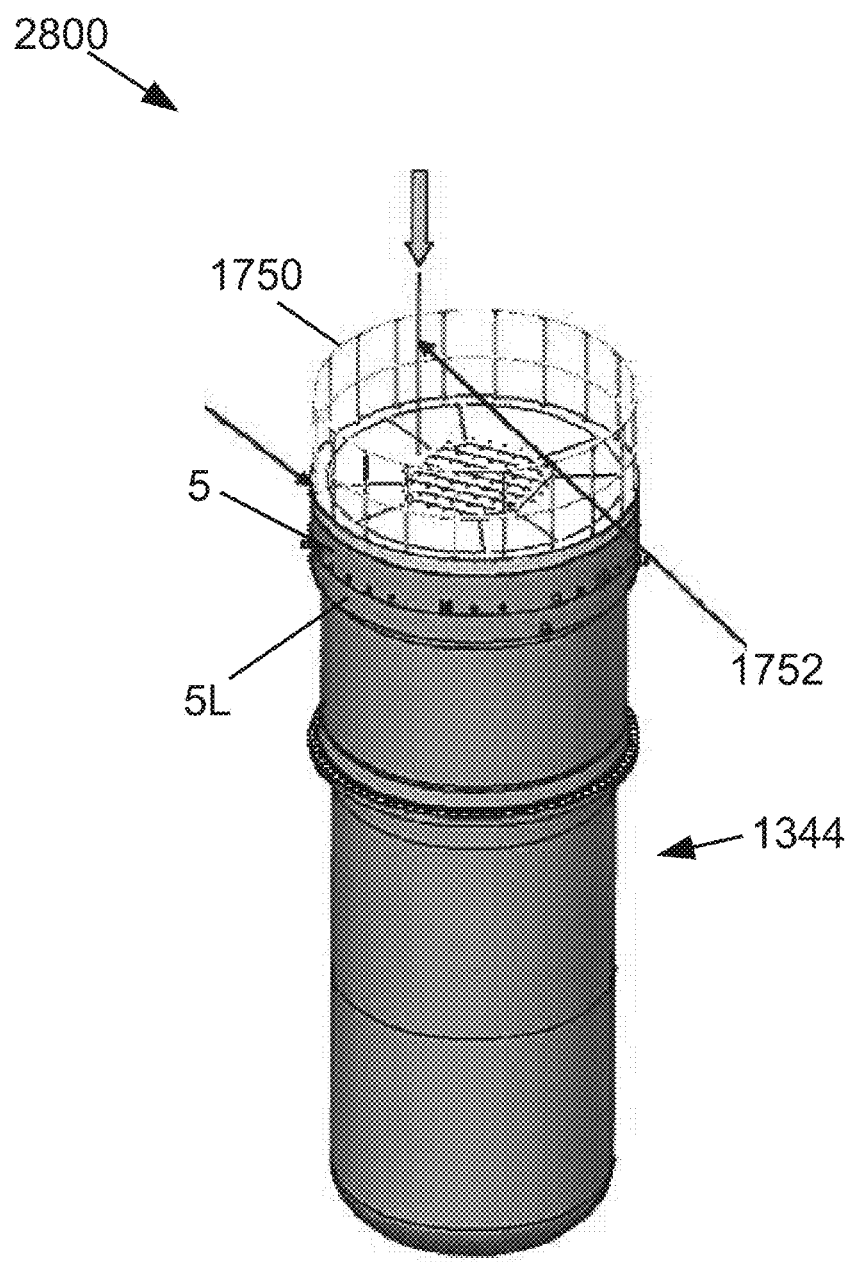

FIG. 29 diagrammatically shows the SMR in a state 2800 corresponding to the operation 1980 of FIG. 20 in which the mid-flange 5 (with the upper internals suspended therefrom) is placed onto the lower vessel flange 5L of the lower vessel 1344, and the tool 1752 (cf. FIG. 18) is used to reconnect the CRDMs with the connecting rods.

Figure 30:
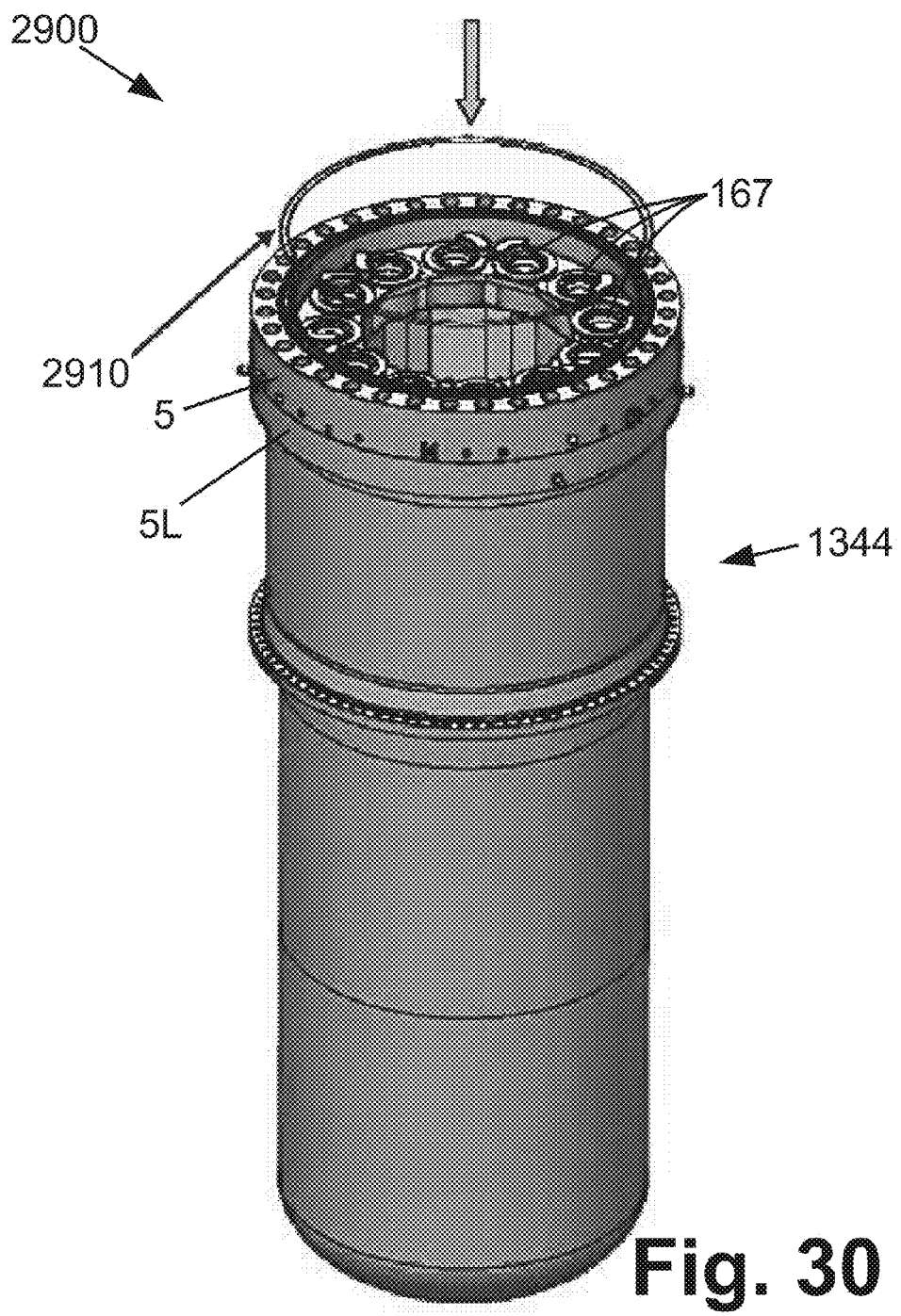

FIG. 30 diagrammatically shows the SMR in a state 2900 corresponding to the operation 2010 of FIG. 21 in which the refueling platform 1750 (see FIG. 29) is removed, existing o-rings are removed and new o-rings 2910 are installed on the upper surface of the mid-flange 5.

The remaining SMR re-assembly operations of FIGS. 21 and 22 are not explicitly illustrated, but comprise a reversal of corresponding disassembly operations of FIGS. 2-4. For example, operation 2040 of FIG. 21 corresponds to FIG. 15; operation 2050 of FIG. 21 corresponds to FIG. 14; and so forth.

The use of the mid-flange 5 advantageously provides a support element for the upper internals that optionally integrates the electrical (and, if needed, hydraulic) vessel penetrations. This enables the upper internals, including the electrical cabling from the vessel penetrations to the CRDM motors 8m (or other elements) to be kept in place as the mid-flange 5 and suspended upper internals are lifted out (e.g., as shown in FIG. 19). However, in alternative embodiments (not shown) it is contemplated to employ a support element other than the illustrated mid-flange 5 for supporting the upper internals in suspended fashion. For example, the support element can be a forged annular ring with outer diameter is equal to or smaller than the inner diameter of the lower vessel section so as to fit inside the lower vessel and sit on discrete ledges (or a continuous annular ledge) on the inside surface of the lower vessel section. Such a ledge or ledges can be formed integrally as part of the forged lower vessel section, or can be welded to the lower vessel section. The upper internals are then lifted out by anchoring the crane to the annular ring or other support element and lifting it out of the lower vessel section. In these alternative embodiments, the support element is not part of the pressure boundary and cannot include the vessel penetrations for accessing the upper internals, and so an additional operation of disconnecting cabling inside the pressure vessel is needed before the support element and suspended upper internals can be lifted out.

The illustrative embodiments have been described with reference to the preferred embodiments. Obviously, modifications and alterations will occur to others upon reading and understanding the preceding detailed description. It is intended that the illustrative embodiments be construed as including all such modifications and alterations insofar as they come within the scope of the appended claims or the equivalents thereof.

We claim:
1. A method comprising:
depressurizing a nuclear reactor that includes at least:
a pressure vessel including an upper vessel section and a lower vessel section connected by a mid-flange and containing primary coolant,
a nuclear reactor core disposed in the lower vessel section and immersed in the primary coolant, and
upper internals suspended from the mid-flange of the pressure vessel and disposed below the mid-flange, the upper internals including at least internal control rod drive mechanisms (CRDMs) with CRDM motors immersed in the primary coolant and control rod guide frames disposed between the CRDM motors and the nuclear reactor core;
disconnecting and removing the upper vessel section from the remainder of the pressure vessel while leaving the mid-flange in place on the lower vessel section with the upper internals remaining suspended from and disposed below the mid-flange;
removing the mid-flange from the lower vessel section with the upper internals remaining suspended from the mid-flange and disposed in the lower vessel section;
replacing fuel of the nuclear reactor core;

placing the mid-flange back onto the lower vessel section with the upper internals remaining suspended from the mid-flange; and placing the upper vessel section back onto the remainder of the pressure vessel and re-connecting the upper vessel section with the remainder of the pressure vessel, wherein the nuclear reactor further includes a central riser disposed in the upper vessel section and riser cone connecting the central riser with the lower vessel section, the riser cone remaining disposed with the remainder of the pressure vessel upon completion of the disconnecting and removing of the upper vessel section, and the method further comprises:

removing the riser cone prior to removing the mid-flange from the lower vessel section with the upper internals remaining suspended from the mid-flange.

2. The method of claim 1 wherein the disconnecting comprises disconnecting fasteners that extend through a flange assembly including the mid-flange, a flange on the upper vessel section, and a flange on the lower vessel section.

3. The method of claim 2 wherein the disconnecting also disconnects the upper vessel section from the remainder of the pressure vessel and disconnects the mid-flange from the lower vessel section, the disconnecting and removing of the upper vessel section leaving the mid-flange in place on the lower vessel section due to weight of the mid-flange and the upper internals that remain suspended from the mid-flange.

4. The method of claim 2 wherein the fasteners include bolts that remain in a parked position at least partially inserted into the flange on the upper vessel section after completion of the disconnecting and removing of the upper vessel section.

5. The method of claim 2 wherein the fasteners include bolts that remain in a parked position at least partially inserted into one of (1) the flange on the upper vessel section and (2) the flange on the lower vessel section after completion of the disconnecting and removing of the upper vessel section.

6. The method of claim 1 wherein the nuclear reactor further includes a steam generator disposed inside and secured with the upper vessel section, and the steam generator remains disposed inside and secured with the upper vessel section during and upon completion of the disconnecting and removing of the upper vessel section.

7. The method of claim 1 wherein the mid-flange includes electrical connections through the mid-flange to the upper internals, and the method further comprises:

prior to the removing of the mid-flange, disconnecting cables external to the pressure vessel from the connections through the mid-flange to the upper internals.

8. The method of claim 7 wherein cables internal to the pressure vessel running from the connections through the mid-flange to the upper internals are left in place during the removing of the mid-flange.

9. A method comprising:

depressurizing a nuclear reactor that includes at least:
a pressure vessel including an upper vessel section and a lower vessel section connected by a flange assembly and containing primary coolant wherein the flange assembly includes at least a flange on the upper vessel section and a flange on the lower vessel section, a nuclear reactor core disposed in the lower vessel section and immersed in the primary coolant, a mid-flange supported by the lower vessel section, and upper internals suspended from the mid-flange of the pressure vessel and disposed below the mid-flange, the upper internals including at least internal control rod drive mechanisms (CRDMs) with CRDM motors immersed in the primary coolant and control rod guide frames disposed between the CRDM motors and the nuclear reactor core;

disconnecting the upper vessel section from the lower vessel section and lifting the upper vessel section away from the lower vessel section with the mid-flange remaining supported by the lower vessel section and the upper internals remaining suspended from and disposed below the mid-flange;

lifting the mid-flange away from the lower vessel section with the upper internals remaining suspended from the mid-flange so as to lift both the mid-flange and the suspended upper internals away from the lower vessel section;

replacing fuel of the nuclear reactor core disposed in the lower vessel section; lowering the mid-flange back onto the lower vessel section with the upper internals remaining suspended from the mid-flange;

reconnecting the upper vessel section to the lower vessel section; and re-pressurizing the nuclear reactor, wherein the nuclear reactor further includes a central riser disposed in the upper vessel section and riser cone connecting the central riser with the lower vessel section, the riser cone remaining disposed with the lower vessel section upon completion of the disconnecting and lifting of the upper vessel section away from the lower vessel section, the method further comprising:

removing the riser cone prior to lifting the mid-flange away from the lower vessel section with the upper internals remaining suspended from the mid-flange.

10. The method of claim 9 wherein the mid-flange connects the upper and lower vessel sections.

11. The method of claim 10 wherein the mid-flange includes vessel penetrations connecting with the upper internals and the method further comprises:

before lifting the mid-flange away from the lower vessel section, disconnecting external connections to the vessel penetrations of the mid-flange.

12. The method of claim 11 wherein the disconnecting of the upper vessel section from the lower vessel section also disconnects the mid-flange from the lower vessel section, the mid-flange remaining supported by the lower vessel section due to weight of the mid-flange and weight of the upper internals that remain suspended from the mid-flange.

13. The method of claim 9 wherein the nuclear reactor further includes a steam generator disposed inside and secured with the upper vessel section, and the steam generator remains disposed inside and secured with the upper vessel section during and upon completion of the disconnecting and lifting of the upper vessel section away from the lower vessel section.

* * * * *